US010460126B2

(12) United States Patent
Pead

(10) Patent No.: US 10,460,126 B2
(45) Date of Patent: Oct. 29, 2019

(54) PROVIDING USER CONTROL OF SHARED PERSONAL INFORMATION

(71) Applicant: Adobe Inc., San Jose, CA (US)

(72) Inventor: Scott T. Pead, Mapleton, UT (US)

(73) Assignee: Adobe Inc., San Jose, CA (US)

( * ) Notice: Subject to any disclaimer, the term of this patent is extended or adjusted under 35 U.S.C. 154(b) by 179 days.

(21) Appl. No.: 15/357,017

(22) Filed: Nov. 21, 2016

(65) Prior Publication Data

US 2018/0144153 A1 May 24, 2018

(51) Int. Cl.
*H04L 29/06* (2006.01)
*G06F 21/62* (2013.01)
*H04L 29/08* (2006.01)
*G06Q 30/02* (2012.01)
*H04L 9/32* (2006.01)

(52) U.S. Cl.
CPC ..... *G06F 21/6245* (2013.01); *G06Q 30/0201* (2013.01); *H04L 9/3236* (2013.01); *H04L 63/102* (2013.01); *H04L 67/20* (2013.01); *H04L 67/22* (2013.01); *H04L 67/306* (2013.01); *H04L 2209/38* (2013.01)

(58) Field of Classification Search
CPC ... G06F 21/6245; H04L 67/22; H04L 63/102; H04L 67/306

USPC .......................................................... 726/28
See application file for complete search history.

(56) References Cited

U.S. PATENT DOCUMENTS

2013/0304708 A1† 11/2013 Ritchie et al.
2015/0312236 A1* 10/2015 Ducker .................. H04L 63/08
  726/4
2016/0219436 A1† 7/2016 Bhasin et al.

FOREIGN PATENT DOCUMENTS

WO        2017136956      † 8/2017
WO   WO-2017136956 A1 *  8/2017 ............. G06F 21/62

\* cited by examiner
† cited by third party

*Primary Examiner* — Evans Desrosiers
(74) *Attorney, Agent, or Firm* — Keller Jolley Preece

(57) ABSTRACT

The present disclosure relates to a digital verification system that enables users (e.g., consumers) to control the sharing of their personal information among online providers. The digital verification system provides systems and methods that enable a user to authorize verification requests from third-party providers that request private information about the user. The digital verification system also provides a secure database that stores user information and securely processes authorized verification requests. In particular, the secure database stores lifetime value blockchains for users that the digital verification system accesses when verifying authorized requests.

20 Claims, 12 Drawing Sheets

PROVIDING USER CONTROL OF SHARED PERSONAL INFORMATION

BACKGROUND

Advancements in computer and communication technologies have increased the ease at which people can communicate, search and find information (e.g., Internet searches), and conduct business (e.g., buy and sell times). Often, when an individual uses a computing device to perform one of a variety of communication functions, an online provider can track and store information about the individual. This information can include actions taken by the individual (e.g., items purchased, products viewed), preferences indicated by the individual (e.g., interests, hobbies), location and device information associated with the user, and other privacy information. In some instances, this tracked information can improve the individual's experience with an online provider. For example, an online provider stores and subsequently loads an individual's preferences each time the individual visits the online provider. In another example, an online provider provides discounts to individuals (e.g., customers) who frequently purchase items from the online provider (e.g., a loyalty discount program).

Although allowing an online provider the ability to track and store information about an individual can sometimes benefit the individual, the benefit to the individual is generally dwarfed by the benefit to the online provider. For example, many conventional online provider systems benefit financially by collecting and using individuals' information (e.g., to market to the individual and other similar individuals based on the information). Further, due to the value of the information, many conventional systems sell the collected information, or sell access to use the collected information, to third parties. Accordingly, conventional online providers often continue to receive a generous financial gain based on an individual's information. As a result, conventional systems often profit at the expense of the privacy of an individual, while providing little benefit to the individual in return.

Much of the problem of protecting an individual's privacy stems from individuals not understanding what information is being collected, when it is being collected, and with whom it is being shared. Stated differently, under conventional systems, even when an individual consents to share their information with an online provider, the individual often does not understand the value of their information. For example, an individual with a registered account at an online provider may understand that the online provider tracks the individual's purchases with the online provider, however, the individual may not understand the benefits that the online provider receives based on using the information and/or sharing the information with third parties. Accordingly, due to most individuals not understanding the actual value of their tracked information, individuals often consent to an online provider tracking data while not receiving a commensurate benefit in return.

Moreover, even when an individual does comprehend the scope of an online provider tracking and storing the individual's online activity information, once the individual provides consent, the individual has little control regarding how the online provider uses the information and with whom the online provider shares the information. For example, an individual often cannot prevent an online provider from sharing their information with a third party or limit the third parties with which the online providers share their information.

Furthermore, even in the cases where it would benefit an individual to share their tracking history information, often conventional systems do not allow a user to control the transaction of sharing tracking information in direct exchange for a benefit because conventional systems often to not provide the individual access to their own tracked information. For example, conventional systems often use an individual's information to provide enhanced services and/or better service to that individual, especially when the individual establishes a strong purchase history. However, if the individual visits a new online provider, the new online provider has little or no information regarding the individual or their strong purchasing history. Further, conventional systems provide no options to allow a user to share their purchase history from other online providers with the new online provider. Instead, the individual will have to establish a new history with the new online provider, while meanwhile receiving a lower level of service than earned.

These and other problems exist with regard to current and convention online provider systems. Accordingly, there remains a need for an improved framework to share digitally verifiable information where individuals control sharing.

BRIEF SUMMARY

Embodiments of the present disclosure include systems and methods that provide a framework allowing users (i.e., individuals) to control sharing of their personal digital information among third-party providers (e.g., a website or application provider). For example, the disclosed systems and methods enable a user to selectively create lifetime value blockchains that include digitally verifiable information for the user. In particular, the systems and methods provide a user control over which information is added to their lifetime value blockchain. In addition, the systems and methods enable the user to selectively authorize a third-party provider to query the user's lifetime value blockchain to obtain limited, relevant, and digitally verifiable information regarding the user.

In one or more embodiments, the systems and methods enable verification of a user's personal digital information. For example, a user visiting a third-party provider's website may desire to exchange a defined amount of personal information in exchange for enhanced services, such as a discount on an online purchase. In one or more embodiments, the systems and methods allow the user to authorize a lifetime value verification request from a third-party provider. For instance, and based on receiving the user's authorization, the systems and methods access digitally verifiable information within a secure database to provide a lifetime value verification response to the third-party provider. In particular, the lifetime value verification response can verify whether or not the user qualifies for the enhanced services, often in the form of a binary response. In this manner, the user controls the type and amount of information that is shared with third-party providers, and in turn, the third-party provider can trust that any information shared is accurate and authentic.

In addition to controlling information shared with a third-party provider, the systems and methods further enable a user to control what information is added to the user's lifetime value blockchain. For example, in one or more embodiments, based on a user completing a transaction, the systems and methods enable the user to control which transactions are added to their lifetime value blockchain. In particular, the systems and methods receive authorization from the user to track transaction information from approved third-party providers. Then, upon detecting that the user completes a transaction from an approved third-party provider, the systems and methods generate a digitally verifiable transactional record based on the transaction data and add the transaction record to the user's lifetime value blockchain within a secure database.

Additional features and advantages of one or more embodiments of the present disclosure are set forth in the description which follows, and in part will be obvious from the description, or may be learned by the practice of such example embodiments.

BRIEF DESCRIPTION OF THE DRAWINGS

The disclosure describes one or more embodiments with additional specificity and detail through the use of the accompanying drawings, as follows.

DETAILED DESCRIPTION

Figure 1:
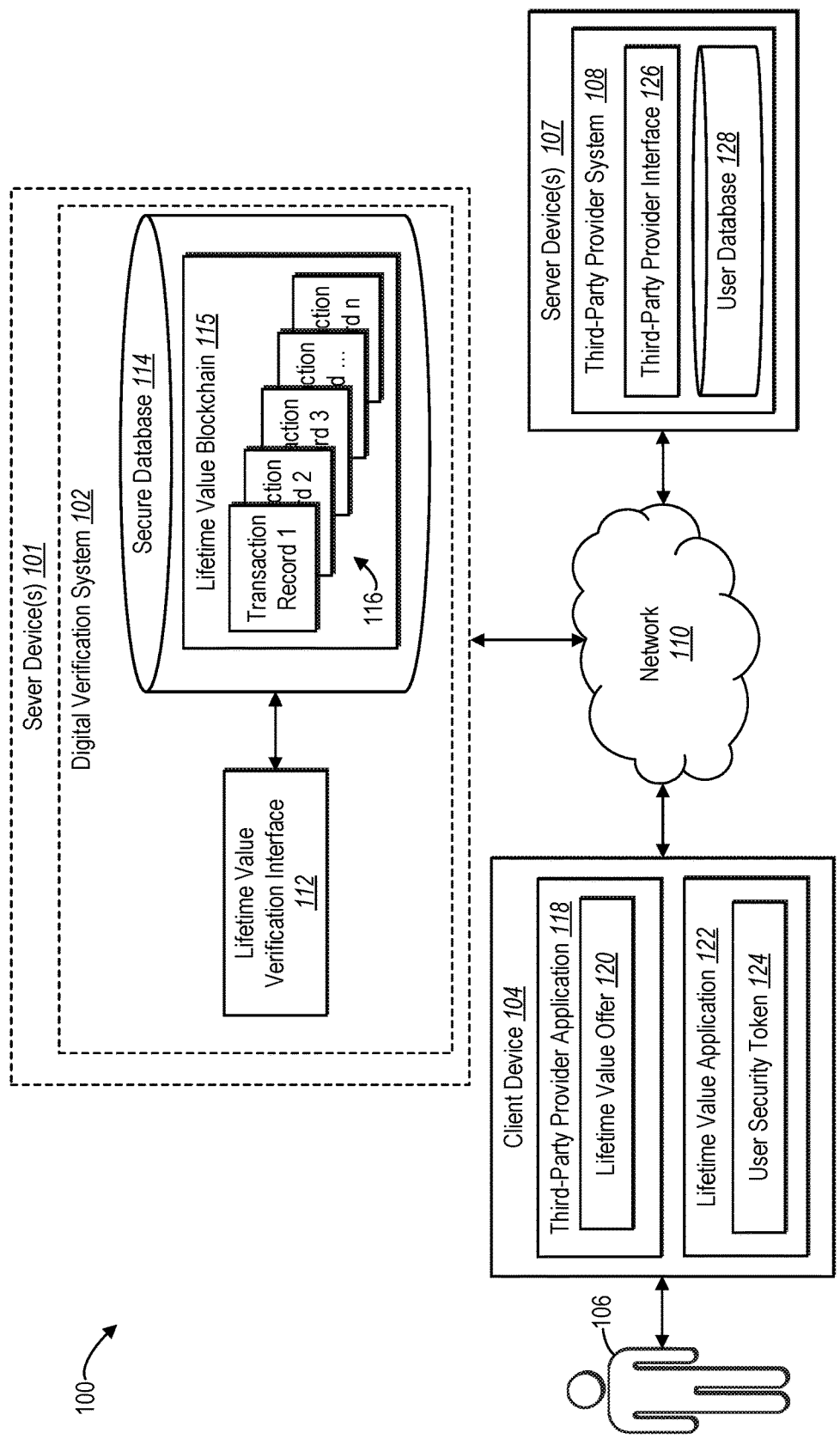
FIG. 1 illustrates a schematic diagram of an example environment in which a digital verification system operates in accordance with one or more embodiments.

One or more embodiments of the present disclosure include a digital verification system that improves sharing a user's digitally verifiable information with a third-party provider while providing control of digital information collection and sharing to the user. As described in detail below, the digital verification system includes a secure database to store lifetime value blockchains (e.g., digital transaction records of a user with one or more third-party providers ("blocks") aggregated within a data chain ("blockchain")). Moreover, the digital verification system employs user authentications and encoded communications to provide user-controlled digitally verifiable information to third-party providers. Accordingly, the digital verification system empowers users, rather than third-party providers, to control the collecting and sharing of the user's personal information. In this manner, the digital verification system promotes user fairness in an area where a user's information is traditionally undervalued, while at the same time providing valuable and verifiable user information to third-party providers.

As an overview, the digital verification system enables third-party providers to obtain digitally verifiable user information associated with a user while, at the same time, providing the user with control over the collecting and sharing of user information. In general, the digital verification system provides systems and methods to: 1) allow a user to control the extent to which the digital verification system collects information associated with the user; 2) securely collect and store digitally verifiable information that a user authorized for collection; 3) enable a third-party provider to incentivize a user to share the user's information with the third-party provider; and 4) provide defined portions of a user's information to third-party providers based on receiving a user's authorization. To illustrate how the digital verification system collects, securely stores, and selectively shares a user's personal information, the following provides an overview of an example embodiment of the digital verification system.

In particular, in one or more embodiments, the digital verification system allows a user to control the extent to which the digital verification system collects information associated with a user. In some embodiments, a user can create an account on the digital verification system (e.g., via an application on a client device). The user defines information collection authorizations within the user account to control the collection of a user's digital transaction information (e.g., a user's activity on third-party provider systems). For example, a user defines authorizations based on information type (e.g., purchase history, shopping cart history, viewing history), category (e.g., sporting goods, books), third-party provider, and/or other basis. Moreover, in one or more embodiments, the digital verification system allows a user to authorize the collection of user information on a transaction-by-transaction basis.

Based on a user's information collection authorization(s), the digital verification system collects and securely stores digitally verifiable information associated with the user. In particular, based on a user's activity with a third-party provider system (e.g., activity on a third-party provider website or application), the digital verification system receives analytics data from the third-party provider system that indicates the user's activity. Upon receiving the analytics data, the digital verification system accesses the user's account within the digital verification system to determine whether the received analytics data includes information that the user has authorized the digital verification system to collect and store based on the user defined information collection authorizations.

Upon determining the user authorized the collection of information that the digital verification system receives from a third-party system, the digital verification system stores the user's information within a secure database. For example, in one or more embodiments, the digital verification system generates a transaction record that includes the received information, and links the transaction record with a blockchain of transactional records associated with the user. Accordingly, overtime, the digital verification system stores information describing a user's digital activity by creating a blockchain of transactional records that the user has specifically authorized for collection and storage. Importantly, based on the above principles, the blockchain results in linked transactional records that are digitally verifiable (e.g., the transactional records are created in direct response to a user's actual interaction or activity on one or more third-party provider websites).

In addition to collecting user information, the digital verification system enables third-party providers the ability to request permission from a user to have the digital verification share a discrete portion of the user's information with the third-party provider. In one or more embodiments, a third-party provider can incentivize a user to share information. For example, a third-party provider system presents an offer (e.g., a discount) to the user in exchange for the user granting permission for the digital verification system to share a defined portion of the user's information. For instance, the third-party provider system provides a selectable graphic, button, or link on a website that displays the offer to the user.

Upon the user selecting the offer, the user is prompted to authorize a verification request for the defined portion of the user's information to the digital verification system. For example, the selection of the third-party offer causes the client device to pass information associated with the verification request to an application on the user's client device to request the user's authorization to share the defined portion of personal information with third-party provider system. In particular, the application provides a notification that informs the user of the verification request details (e.g., a description of the requested personal information and the identity of the third-party provider).

In response to the notification, the user interacts with the application on the client device to provide authorization for the digital verification system to process the verification request and share the defined portion of information with the third-party provider system. For example, the user can interact with the application on the client device to provide user input that authorizes the verification request (e.g., a password or biometric input). Based on receiving user input that authorizes the verification request, the application generates and sends the authorized verification request to the digital verification system that grants permission to the digital verification system to share the defined portion of the user's digitally verifiable personal information.

In one or more embodiments, the application on the client device also encodes the verification request using a private security token (e.g., a private key) unique to the user. For instance, when the digital verification system creates a user account, the digital verification system can provide a private security token that is securely stored on the user's client device. Accordingly, based upon receiving user input that authorizes a verification request, the application on the client device encodes the verification request with the stored private security token. Upon receiving the encoded verification request, the digital verification system decodes the verification request with a matching token (e.g., stored within a secure database of the digital verification system). Accordingly, the use of the private security tokens to encode the verification request provides an additional layer of security to allow the digital verification system to confirm that the user did indeed authorize the verification request and has agreed to share the user's information.

As a result of receiving the authorization message from the user's client device, the digital verification system processes the verification request by accessing digitally verifiable information associated with the user. In particular, the digital verification system accesses a blockchain associated with the user to identify transaction records within the blockchain that are relevant to the verification request. For example, the verification request from the third-party system may include a request to know a dollar amount the user has spent within a particular product category. Accordingly, in such an example, the digital verification system accesses the user's digitally verifiable information (e.g., stored within transaction records of the user's blockchain) and determines the requested dollar amount.

After determining a result to the verification request, the digital verification system provides the determined result to the third-party provider system. For example, the digital verification system sends a response message to the third-party provider system that references the verification request and includes the user information. The third-party provider system can then store and use the user's information within the third-party provider system. For example, in one or more embodiments, the third-party provider system can activate an offer to the user based on the user information meeting a particular threshold (e.g., whether the user has spent over a threshold dollar amount within a particular product category).

In this manner, the digital verification system provides numerous benefits to both to users and the third-party providers. For users, the digital verification system provides control of information sharing to the individual user. For example, the digital verification system allows a user to choose when and what type of information to store and track. In addition, the digital verification system enables the user to authorize information sharing, which includes the user choosing which information he or she is willing to share with a particular third-party provider. The user also approves the parameters of any verification request to ensure the third-party provider is not requesting information not approved by the user. Accordingly, the user controls what information the digital verification system shares and with whom the digital verification system shares information.

In some embodiments, the third-party provider offers an enhanced service to the user, such as a promotion, discount, or another offer, in exchange for user information. For example, a third-party provider may deem particular user information valuable enough to offer a user a direct benefit in exchange for the particular information. In the event the offered benefit is sufficient (e.g., the user is willing to share private information in exchange for the benefit), the user can choose to provide the particular third-party provider their information. In this manner, because users actually decide whether a particular offer is sufficient to merit the sharing of personal information, the digital verification system creates a true market place for user information that reflects the value of a user's information. For instance, in the event that most users decide that an offered benefit from a third-party provider is insufficient to disclose personal information, the third-party provider would either have to increase the value of the offered benefit to obtain the desired user information, or choose to simply not obtain the desired user information.

As an additional benefit, the digital verification system limits the amount of a user's information to disclose to a third-party provider. For example, in response to a verification request from a third-party provider, the digital verification system provides a defined portion of user information (e.g., rather than providing all information associated with a user). As such, even when a user chooses to share information with a third-party provider, the digital verification system allows a user to limit the amount of information and/or the level of detail of information.

In addition to providing a user control over sharing information with a third-party provider, one or more embodiments of the digital verification system further provide a user control over the private information that is stored within the digital verification system. In some embodiments, the user specifies which transactions or types of transactions are added to their lifetime value blockchain. Further, the user can review, group, ungroup, or remove previous transactions. As such, the user controls the personal information that the digital verification system collects, stores, and shares.

Additional features and characteristics of one or more embodiments of a digital verification system are described with respect to the figures. For example, FIG. 1 illustrates an environment 100 in which server device(s) 101 provide a digital verification system 102. As illustrated, the digital verification system 102 communicates with a client device 104 associated with a user 106. As used herein, the term "user," refers to an individual person. In some embodiments, a user can include a group of individuals and/or entities represented by one or more individuals. For example, a user is associated with a computing device, such as the client device 104 to interact with one or more third-party provider systems (e.g., the third-party provider system 108). For instance, a user can be a consumer that views and purchases products or services from various third-party provider systems.

As further shown in FIG. 1, the digital verification system 102 communicates with a third-party provider system 108 operating on server device(s) 107. As used herein, the term "third-party provider" refers to an entity that provides digital content with which a user can interact using a computing device. In general, a third-party provider operates a third-party provider system 108 to provide digital content to users (e.g., a website, application, or another form of digital content with which a user can interact). Examples of third-party providers include, but are not limited to, providers of entertainment content, news content, social media content, mobile application content, game content, digital media content (digital images/video/audio), or retail content.

For instance, in one or more embodiments, the third-party provider system 108 offers products for users to purchase (e.g., goods and/or services). A third-party provider can have online stores and/or physical stores (e.g., where a user's in-person purchases can be validated digitally). As used herein, the term "product" refers to any good (tangible or intangible), service, article, digital content (e.g., electronic books, electronic articles, digital photos, digital videos) or other marketable object or offering. Further, "product" and "products" can refer to a single product or a grouping of products. The term "product category" may refer to any grouping, type, class, division, subdivision, set, kind, genre, or classification of products. The terms "product brand" or "brand" may refer to a name, term, design, symbol, or any other feature that identifies a product originates from a specific product.

As shown in FIG. 1, the digital verification system 102, the client device 104, and the third-party provider system 108 communicate via a network 110, as shown in FIG. 1. Additional components and features of the environment 100 are described in connection with FIG. 12. As further shown in FIG. 1, the digital verification system 102 includes a lifetime value verification interface 112 (or simply "LTV verification interface 112") and a secure database 114. The secure database 114 includes a lifetime value blockchain 115 that includes one or more transaction records 116 for a user. Generally, the LTV verification interface 112 facilitates communications between the client device 104 and the third-party provider system 108, while the secure database 114 creates, manages, and verifies requests for user lifetime value information.

The term "lifetime value," as used herein, refers to an accumulation of information (e.g., digital data) associated with a user. For example, lifetime value refers to the aggregation of information representing a user's interaction and/or activity in connection with one or more third-party providers. For instance, a user's lifetime value can include browsing history, viewing history, past purchases, location data, device usage, time of day usage, salary information, brand preference, product attribute preference (e.g., sizes, colors, etc.), product warranty information, contact information, or any other information that results from a user's interaction or activities with a third-party provider. Furthermore, a user's lifetime value includes both online transactions, as well as in-person transactions that are digitally verifiable (e.g., by a retail store where a user purchases a product or by a financial institution that confirms a purchase). In some embodiments, a user's lifetime value includes demographic information digitally verifiable by a trusted party (e.g., a government, a credit bureau, or another trusted party). The digital verification system can organize lifetime value by user accounts (e.g., a lifetime value account and alias accounts), data type, third-party provider, product category, time, location, and/or profile data, as described further below.

In one or more embodiments, information associated with a user's lifetime value is based on digitally verifiable information. As used herein, the term "digitally verifiable information," refers to user information that is capable of validation by a party other than the user. For example, digitally verifiable information includes user information validated by a third-party provider, as opposed to information manually entered by a user. For example, a third-party provider validates a user's product purchase on the third-party provider system. In this manner, when the digital verification system performs a verification request, the digital verification system can digitally prove that the result of the verification request is based on true and accurate records, rather than data fabricated by a user.

Furthermore, based upon receiving digitally verifiable information, the digital verification system appends a "transaction record" to a user's lifetime value blockchain. As used herein, a "transaction record" is a portion of data that represents any type of user interaction or activity with a third-party provider system, and a "lifetime value blockchain" (or simply "blockchain") is a data chain that links transaction records associated with a user. A user can have multiple lifetime value blockchains that link different types of transaction records (e.g., defined types of user information). For example, a user may have a lifetime value blockchain for each organizational category listed above (e.g., data type, third-party provider, product category, time, location, profile data, etc.). For example, a lifetime value blockchain includes a user's product purchases from third-party providers, and the digital verification system accesses the lifetime value blockchain to calculate a user's lifetime value as the sum total of the purchases.

Returning to FIG. 1, the dotted line surrounding the LTV verification interface 112 and the secure database 114 indicates that in the illustrated embodiment, the digital verification system 102 encompasses both the LTV verification interface 112 and the secure database 114. In other embodiments, the secure database 114 is separate from the LTV verification interface 112 (e.g., additional API and security may exist between the LTV verification interface 112 and the secure database 114. Further, the digital verification system 102 can operate on one or more computing devices, such as one or more server devices, which are described in detail below with respect to FIG. 12.

FIG. 1 further illustrates that the client device 104 includes a third-party provider application 118 that offers a lifetime value offer 120 (or simply "LTV offer 120"). In one or more embodiments, the third-party provider application 118 is associated with the third-party provider system 108. For example, the third-party provider application 118 is a mobile or desktop application on the client device 104 associated with third-party provider system 108. In some embodiments, the third-party provider application 118 is an internet-browser that provides access to third-party provider system 108 (e.g., a third-party provider website).

The client device also includes a lifetime value application 122 (or simply "LTV app 122"), as shown in FIG. 1. The LTV app 122 is associated with the digital verification system 102. For example, the LTV app 122 communicates with the LTV verification interface 112 when verifying user information. The LTV app 122 includes a user security token 124, such as a key, password, passphrase, pseudo-random output, or a combination thereof. The LTV app 122 uses the user security token 124 to encode verification requests from the third-party provider application 118 based on the user 106 authorizing the verification request. In general, only a user's client device (and the secure database 114) stores the user security token 124. In this manner, in one or more embodiments, a third-party provider cannot circumvent user authorization or otherwise obtain information without a user's consent because the LTV verification interface authorizes each verification request based on obtaining the user security token 124.

Figure 2:
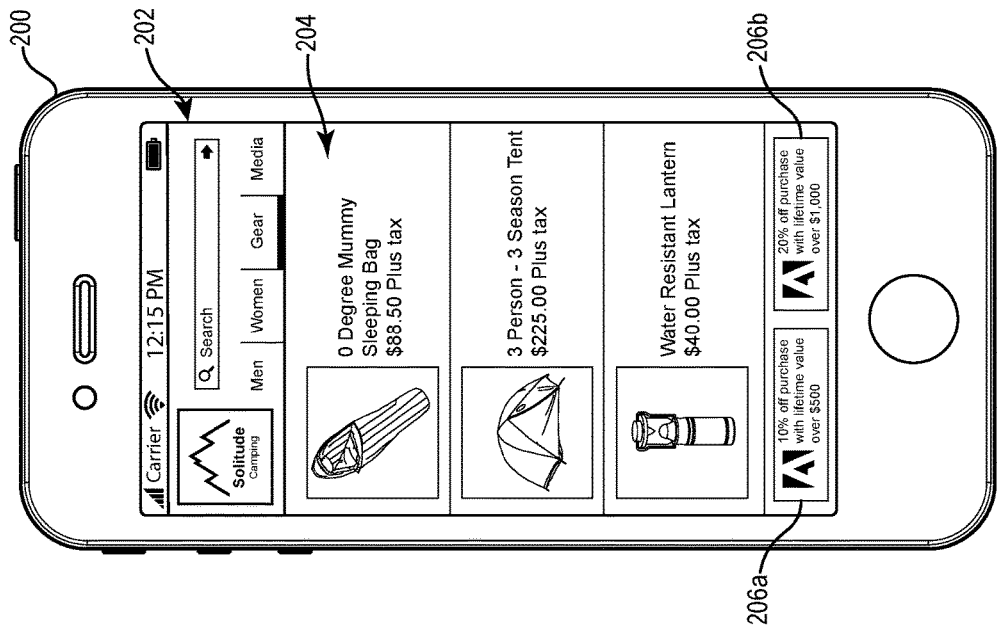
FIG. 2 illustrates an example graphical user interface of a client device displaying lifetime value offers by a third-party provider system in accordance with one or more embodiments.

A briefly mentioned above, the environment 100 includes a user 106 (e.g., consumer). In some embodiments, the user 106 uses the client device 104 to browse products via the third-party provider application 118 and authorize verification requests via the LTV app 122. While browsing products on the third-party provider application 118, the third-party provider may present an LTV offer 120 to the user via the client device 104. In one or more examples, the LTV offer 120 indicates what user information the third-party provider would like to receive and a discount or promotion the third-party provider offers in return for the user sharing the desired information. Examples of lifetime value offers are shown in FIG. 2, as will be discussed further below.

The third-party provider system 108, shown in FIG. 1, includes a third-party provider interface 126 and a user database 128. The third-party provider interface 126 exchanges data with the third-party provider application 118 on the client device 104. Further, as described below, the third-party provider interface 126 facilitates communications with the digital verification system 102, such as sending transaction information to create transaction records for users and/or sending a verification request to request information associated with a user.

The user database 128 maintains a record of users for the third-party provider system 108. For example, when a user authorizes the digital verification system to share the user's information with the third-party provider system 108, the third-party provider system 108 can store the shared information. For instance, upon receiving a result to a verification request, the third-party provider system adds information associated with the result to the user's profile on the user database 128 within the third-party provider system 108.

Additional details regarding the digital verification system 102, the client device 104, and the third-party provider system 108 are provided below in connection with the FIGS. 2-11. For example, FIG. 2 illustrates a graphical user interface 202 displaying two lifetime value offers 206a-b (or "LTV offers 206a-b") that a third-party provider system provides (e.g., via third-party provider application 118). In particular, client device 200 displays the graphical user interface 202. In one or more embodiments, the client device 200 can be the same or similar to the client device 104 described with respect to FIG. 1.

As shown, the graphical user interface 202 displays a list of products 204 (e.g., a sleeping bag, a tent, and a lantern) from a third-party provider (e.g., Solitude Camping) that are available for purchase. The graphical user interface 202 also includes the LTV offers 206a-b. As shown in FIG. 2, the first LTV offer 206a provides a user (e.g., consumer) with 10% off their purchase at Solitude Camping if the user can show that he or she has a lifetime value (from previous purchases) over $500. Meanwhile, the second LTV offer 206b provides a user with 20% off their purchase at Solitude Camping if the user can show that he or she has a lifetime value over $1,000.

While FIG. 2 shows particular LTV offer examples based on the LTV offers 206a-b, one will appreciate that other/different LTV offers are possible. In particular, an LTV offer can be any benefit that a particular third-party provider is willing to offer to a user. For example, an LTV offer could offer free shipping, a free or discounted product, exclusive access to a sale, etc. Similarly, although FIG. 2 shows particular LTV offer conditions based on the LTV offers 206a-b, an LTV offer may be conditional on the user authorizing various types of information. For instance, an LTV offer can include one or more conditions that include various other types of information other than a lifetime value amount.

Notwithstanding the various types of offers or conditions, a third-party provider system can provide an LTV offer based on various triggers. For example, in some embodiments, the third-party provider system causes graphical user interface 202 displays an LTV offer based on detecting a particular user is a new potential customer. On the other hand, in the event the third-party provider system detects that the third-party provider system already has up-to-date user information for the particular user, the third-party provider system can withhold offering a LTV offer via the graphical user interface 202. Accordingly, a third-party provider can analyze various attributes of a particular user to determine whether the third-party provider is interested in offering a benefit in exchange for information associated with the particular user, as well as determine what benefit to offer a particular user.

In one or more embodiments, a third-party provider system can use various LTV offers over a period of time to collect personal information to generate a desired customer profile for a particular user. For example, a third-party provider system can detect a particular user (e.g., based on IP address of the user's client device) and determine that the third-party provider system has previously gained a first type of information for the user (e.g., purchase history with the third-party provider), but that a second type of information is currently unknown within the third-party provider system (e.g., the names of the competitors from which the user has previous made purchases). As such, the third-party provider system can provide an LTV offer in exchange for the second type of user information. Similarly, a third-party provider system can determine that previously obtained user information may be out of date (e.g., based on a data age threshold), and accordingly, provide an LTV offer in exchange for updated user information.

As shown in FIG. 2, in some embodiments, the graphical user interface 202 displays multiple LTV offers in exchange for different types of user information. For instance, a third-party provider system can cause the graphical user interface 202 to provide a range of LTV offers with a corresponding range of user information. In particular, in the event that a third-party provider system does not have any information for a particular user, the third-party provider system can provide various LTV offers that span the range of customer worth (e.g., high worth customers that spend large amounts versus low worth customers that spend small amounts). By providing a range of LTV offers, the user can select which offer he or she would like to verify based on which personal information the user is willing to share, and the third-party provider can obtain critical information that the third-party provider can use to identify user attributes.

Figure 3:
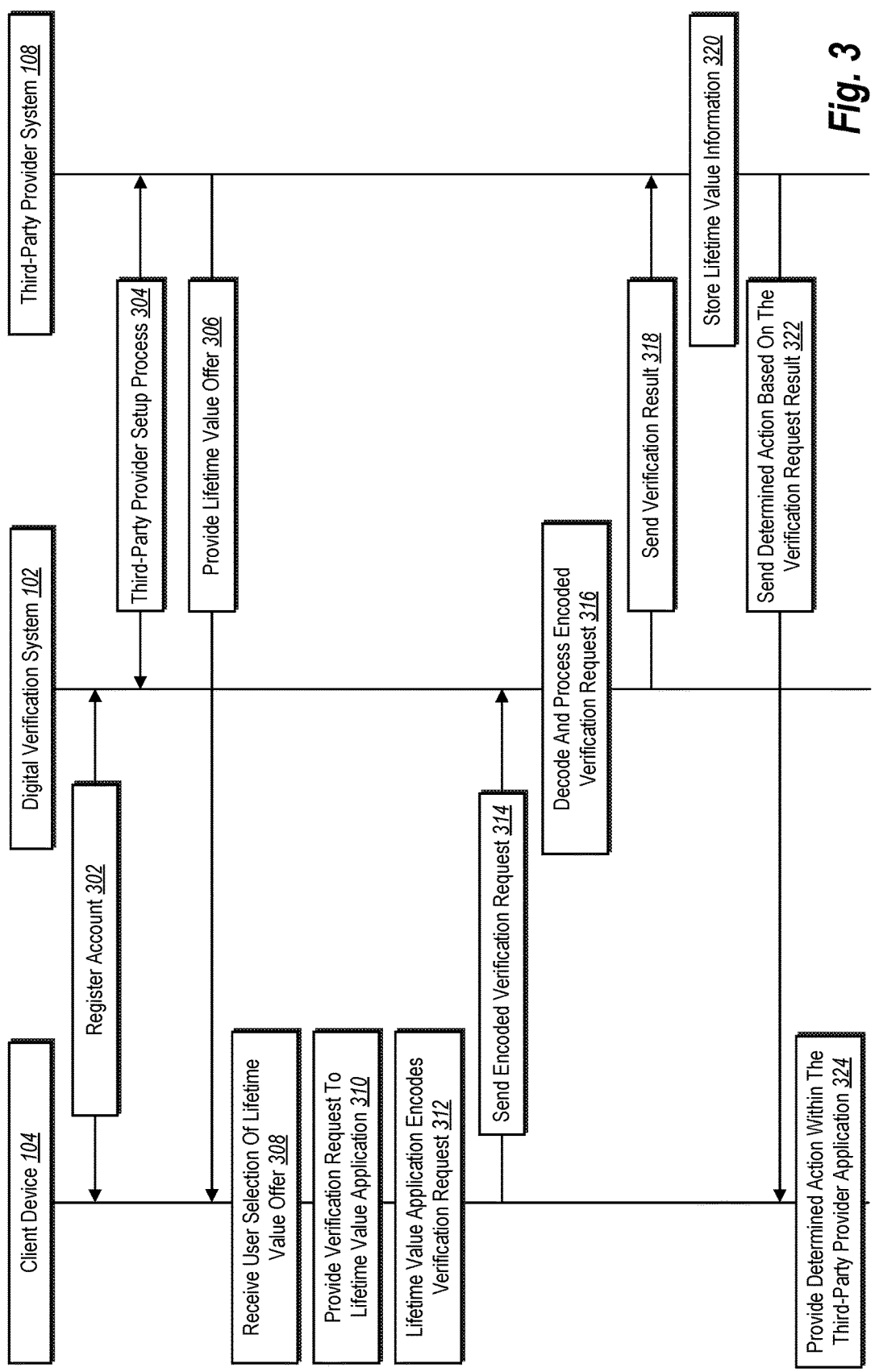
FIG. 3 illustrates an example sequence diagram of the digital verification system verifying an authorized verification request in accordance with one or more embodiments.

To apply to receive an LTV offer, a user selects either the first LTV offer 206a or the second LTV offer 206b, as shown in FIG. 2. The various systems and methods used to allow a user to apply to receive an LTV offer, and to provide user information to the third-party provider system, is further described in connection with FIG. 3. In particular, FIG. 3 illustrates an example sequence diagram demonstrating various example acts the digital verification system performs to process a verification request. As shown, FIG. 3 includes the digital verification system 102 in communication with the client device 104 and the third-party provider system 108. The digital verification system 102, the client device 104, and the third-party provider system 108 shown in FIG. 3 may be examples of the digital verification system 102, the client device 104, and the third-party provider system 108 described with respect to FIG. 1.

As shown in act 302 of FIG. 3, a user (e.g., consumer) uses the client device 104 to register an account (e.g., a lifetime value account) with the digital verification system 102. For instance, the user can access the lifetime value application 122 discussed above with respect to FIG. 1 to register the account with the digital verification system 102. In particular, a user can install the LTV app 122, and interact with various prompts to register for an account with the digital verification system 102. Additionally, if a user has previously created an account, the user can log in using previously created credentials (e.g., a username and password). As shown in act 302, the registration process involves the client device 104 providing various user inputs to the digital verification system 102 (e.g., user account information), and the digital verification system 102 providing account information to the client device 104 (e.g., security tokens). In general, the digital verification system 102 creates an account for the user by initializing a lifetime value blockchain corresponding to the user, and providing a security token to the client device 104 of the user that corresponds to the lifetime value blockchain. The registration process is described in greater detail below in connection with FIG. 4.

In addition to a user registration, the digital verification system 102 can setup a third-party provider to access the digital verification system 102. For example, and as shown in act 304 of FIG. 3, the digital verification system 102 performs a third-party provider setup process. For example, the third-party provider setup process can include sending an API key to the third-party provider system 108 that allows the third-party provider system 108 to invoke API calls to request and receive data from the digital verification system 102. In some instances, the digital verification system 102 provides the API upon the third-party provider system 108 registering with the digital verification system 102.

In addition to providing access to an API, the third-party provider setup process can include allowing the third-party provider system 108 to present LTV offers to users within a third-party provider content available on the third-party provider system 108 (e.g., available on an application or a website). For instance, the third-party provider setup process can include the digital verification system 102 providing a set of instructions (e.g., code) to the third-party provider system 108 that the third-party provider system 108 can use to activate various features and functionality of the digital verification system 102 within a third-party provider application or on a third-party provider website. For example, the set of instructions can include a script that causes the third-party provider system 108 to call the LTV verification interface when a user selects an LTV offer within the third-party provider's application or on the third-party provider's web site.

Once the third-party provider system 108 is setup with the digital verification system 102, the third-party provider system 108 can generate LTV offers to provide to users. In particular, act 306 shown in FIG. 3 illustrates that the third-party provider system 108 provides a LTV offer to the client device 104. For instance, the third-party provider system 108 can provide an LTV offer to the client device 104 within a third-party provider application (e.g., as shown in FIG. 2) or on a third-party provider website. In some embodiments, the third-party provider system 108 periodically sends LTV offers to the third-party provider application, such as in updates to the third-party provider application. Alternatively, the third-party provider system 108 can pre-program the third-party provider application to include a default set of LTV offers.

As FIG. 3 further illustrates, in act 308 the client device 104 receives a user selection of an LTV offer. For instance, a user can interact with a graphical user interface (e.g., using a touch gesture on a touch display) to provide a user selection of an LTV offer. To illustrate, for example, a user can browse products within the third-party provider application and, as part of the user's browsing experience, the third-party provider application provides the 10% LTV Offer and the 20% LTV Offer, as shown in FIG. 2. As mentioned above, by selecting the 20% LTV Offer, the user controls the personal information the user is willing to share in exchange for the listed discount (e.g., verification that the user has a lifetime value of over $1000).

Upon receiving a user selection of the LTV offer, the instructions associated with the LTV offer cause the client device to create a verification request to obtain the information indicated in the LTV offer. In one or more embodiments, when a user is using a third-party provider application, the third-party provider application can generate the verification request. For example, generating a verification request can include creating an argument that the digital verification system 102 applies to a user's personal information. To illustrate, and again referring to FIG. 2, the third-party provider application generates a verification request that includes an argument to confirm that the user has a lifetime value over $1,000 based on the user selecting the 20% LTV Offer. In some embodiments, the verification request includes various parameters, for example, the verification request can include a time frame, a product category, or other parameter to which the requested lifetime value corresponds.

With the verification request generated, one or more embodiments include an act 310 of providing the verification request to an LTV app on the client device 104. In particular, in some embodiments the third-party provider application (e.g., third-party provider application 118) on the client device 104 provides the verification request to the LTV app (e.g., LTV app 122). In particular, the third-party provider application provides the arguments, along with any additional parameters, to the LTV app on the client device 104. In some embodiments, the third-party provider application verifies that the LTV app is installed on the client device 104 before sending the verification request. In the event the LTV app is not installed, the third-party provider application prompts the user to install the LTV app on the client device 104 (which may include the user creating an account).

In one or more embodiments, once the LTV app receives a verification request, the LTV app generates a notification to present to the user. In particular, the LTV app can parse the verification request to identify the arguments and parameters included in the request. The LTV app then generates a notification that indicates the personal information that will be released from the digital verification system 102 in response to the request. In addition, the notification can prompt a confirmation interaction from the user to allow the LTV app to send or cancel the verification request. For example, in some embodiments, the user confirms the verification request by inputting one or more user credentials. Examples of user credentials include, but are not limited to, a username, a password, a biometric input (e.g., fingerprint, iris scan, voice verification, etc.) a passphrase, a pin, a key, a physical device (e.g., a USB key), and a gesture. By requiring that the user provide their credentials, the LTV app validates that the user is indeed authorizing the verification request.

Further, by requiring that the user provide their credentials, the LTV app can differentiate between multiple users that may use the same client device. For instance, when a user provides their credentials, the LTV can confirm the particular user associated with the verification request in the case where multiple users may use the same client device. In an alternative embodiment, the user confirms the verification request without inputting a credential, but by simply selecting an option to proceed with the request.

Regardless of the various ways in which a user can authorized a verification request, in one or more embodiments, the LTV app encodes the verification request, shown in act 312 of FIG. 3. In particular, the LTV app encodes the verification request with the user security token stored within the LTV app on the client device 104. For example, the LTV app uses a private key (with or without salt) to encrypt the verification request. In general, the user security token is only available on the user's client device, however, in some embodiment, an optional copy of the user security token is stored in the secure database of the digital verification system 102. Further, the user security token is locked and only accessible in response to the user providing their credentials, such as when authorizing a verification request as discussed above.

After encoding the verification request, FIG. 3 shows act 314 of the client device 104 sending the encoded verification request to the digital verification system 102. Using the user's security token protects the contents of the request while traveling across unsecured networks (e.g., the Internet). Further, using the user's security token to encode the verification request securely confirms to the digital verification system 102 that the user authorized the verification request.

Upon receiving the encoded verification request, act 316 shows that the digital verification system 102 decodes and processes the encoded verification request. In particular, the digital verification system 102 uses header information sent with the request to identify that the request came from the client device 104 that is associated with a particular user, and because the verification request is encoded with the user security token, the digital verification system 102 can confirm that the particular user authorized the request. Stated differently, if the verification request was not encoded with the user security token, the digital verification system 102 does not validate that the user has authorized the verification request, and the verification request is denied.

In some embodiments, the digital verification system 102 decodes the verification request using a complementary security token. For example, if the LTV app encrypted the verification request with a private key, the digital verification system 102 uses a corresponding asymmetric public key to decrypt the request. One will appreciate, based on the disclosure herein, that the digital verification system 102 can employ other public key infrastructure (PKI) techniques to encode and decode a verification request. In one or more embodiments, decoding the verification request occurs within the secure database. Alternatively, the secure database stores the complementary security token for the user and provides the complementary security token to the digital verification system 102 for decoding a verification request.

Once the verification request is decoded, the digital verification system 102 processes the verification request. More specifically, the digital verification system 102 uses the arguments and any parameters included in the verification to verify user information within the secure database and determine a verification result for the verification request. To illustrate, using the example based on FIG. 2, the digital verification system 102 accesses the secure database with parameters associated with the 20% LTV Offer to the secure database. Upon decoding the verification request, in one or more embodiments, the digital verification system 102 identifies a user identifier of the user, the requested LTV amount (e.g., $1,000), and any additional parameters. The digital verification system 102 uses the user identifier to identify one or more lifetime value blockchains associated with the user within the secure database. Once the digital verification system 102 identifies the user's lifetime value blockchain(s), the digital verification system 102 determines if the requested LTV amount meets or exceeds the user's lifetime value, or if the requested LTV is below the user's lifetime value. Thus, if the user has a lifetime value that meets or exceeds $1,000, the digital verification system 102 determines a positive result. Alternatively, if the user has a lifetime value less than $1,000, the digital verification system 102 determines a negative result.

In some embodiments, the digital verification system 102 determines the result by performing a numeric comparison. For example, the digital verification system 102 compares the requested amount to the sum total of purchases in one or more of the user's lifetime value blockchains. In other embodiments, the secure database employs analytics, pattern recognition, machine-learning, or other techniques to determine a result based on the submitted argument. Additional detail regarding how the digital verification system 102 and the secure database process verification requests is discussed below with respect to FIG. 9.

Once the digital verification system 102 determines a verification result, the digital verification system 102 sends the verification result to the third-party provider system 108, as act 318 of FIG. 3 illustrates. The digital verification system 102 may send the verification result directly to the third-party provider system 108, as shown in FIG. 3. Alternatively, the digital verification system 102 sends the verification result to the third-party provider system 108 by way of the LTV app on the client device 104. In one or more embodiments, the digital verification system 102 can encode or otherwise obfuscate the verification result to protect the contents of the results from unwanted recipients.

Irrespective of how the third-party provider system 108 receives the verification result, act 320 shows that the third-party provider system 108 can store the verification result, as shown in FIG. 3. From the perspective of the third-party provider system 108, the verification result represents a data point for the user that the user has chosen to share with the third-party provider system 108. Importantly, the verification result is a piece of digitally verifiable information that the third-party provider system 108 can rely on as true and accurate.

In act 322, the third-party provider system 108 determines an action based on the verification result and sends the determined action to the client device 104 (e.g., to the third-party provider application). In act 324, the third-party provider application provides the determined action to the user. For instance, if the verification request result is positive (e.g., a Boolean 1 or "yes"), then the third-party provider system 108 extends an offer. In the case of the 20% LTV Offer, if the verification request result indicates that the user has a lifetime value of over $1,000, then the third-party provider application extends or activates a 20% discount on products being purchased by the user. If, on the other hand, the verification request result is negative (e.g., a Boolean 0 or "no"), the third-party provider application does not extend the discount. Rather, the third-party provider application can provide a message to the user that they did not qualify for the offer.

If multiple LTV offers are available, the user can select a second LTV offer. For example, if the user did not meet the conditions of the 20% LTV Offer, the user can select the 10% LTV Offer. In this case, acts 308-324 repeat. Notably, the user again confirms the verification request from the LTV app to ensure that the user is authorizing the request and not that the third-party provider is attempting to gain more personal information than agreed to by the user.

Further, if based on a verification result, the user qualifies for multiple LTV offers, the third-party provider may require the user to pick an LTV offer to apply. Alternatively, the third-party provider may permit the user to stack offers, such as an offer for free shipping with an offer for 20% off. For example, the third-party provider may provide different LTV offers to obtain different pieces of information from the user. As such, the user controls the sharing of their private information. Further, when the user's private information is shared, the user willfully volunteers this information in exchange for a predefined benefit.

Figure 4:
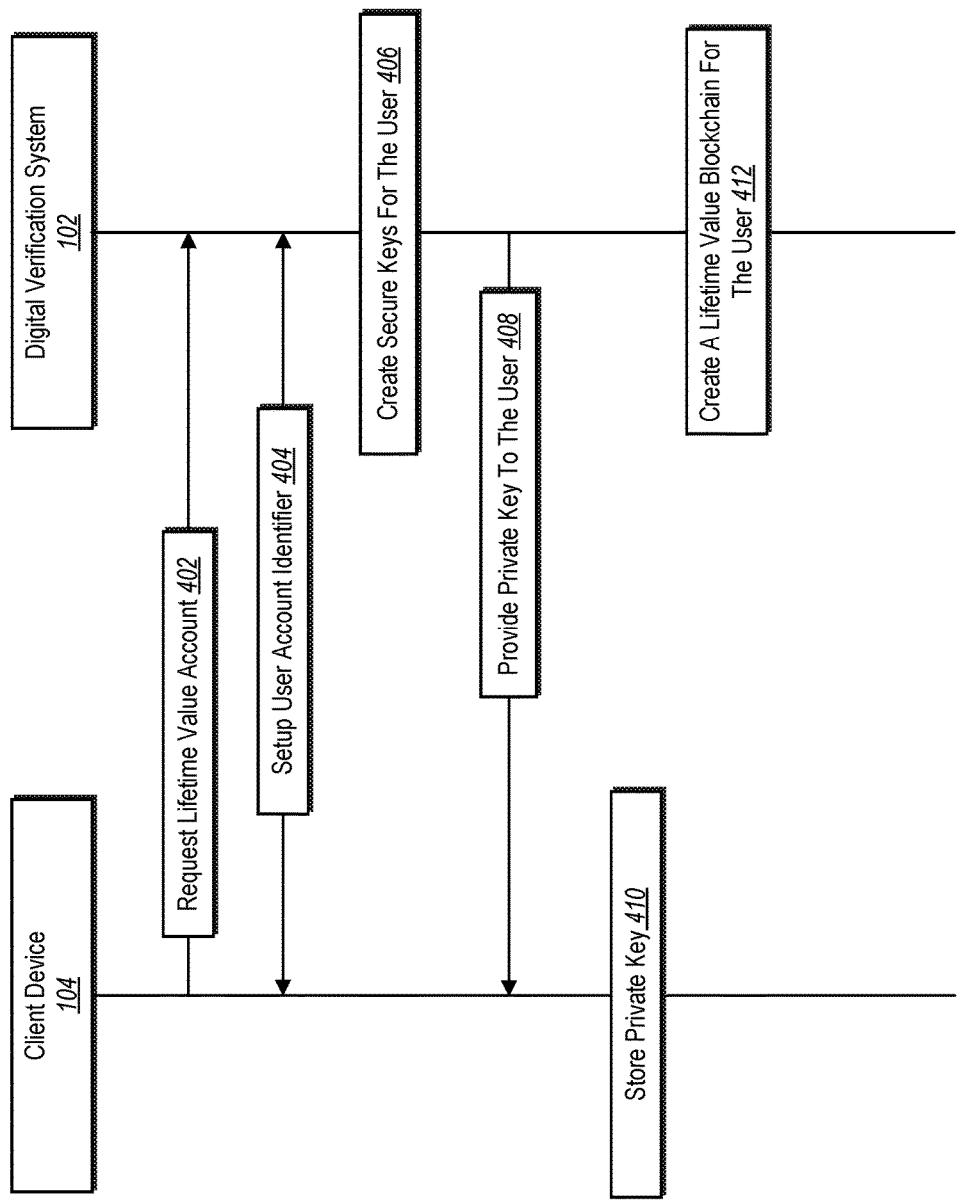
FIG. 4 illustrates an example sequence diagram of the digital verification system registering a lifetime value account in accordance with one or more embodiments.

As mentioned above, FIG. 4 more specifically discusses the user registration process. In particular, FIG. 4 illustrates an example sequence diagram of the digital verification system 102 registering a lifetime value account. As shown, FIG. 4 includes the digital verification system 102 in communication with the client device 104. The digital verification system 102 and the client device 104 may be examples embodiments of the digital verification system 102 and the client device 104 above.

In act 402, the user, via the client device 104, requests a lifetime value account from the digital verification system 102. For example, the user interacts with the LTV app or a browser accessing a website of the digital verification system 102 to create a lifetime value account. As part of creating an account, the user inputs credentials, such as a user identifier and password, as shown in act 404. The user identifier uniquely identifies the user from other users of the digital verification system 102. Further, as described below, by providing credentials, the user can recover their personal user security token if it becomes lost, or the user transfers to another client device.

As shown in act 406, the digital verification system 102 creates secure keys (i.e., security tokens) for the user. In one or more embodiments, the digital verification system 102 generates a set of private and public keys unique to the user's lifetime value account. The digital verification system 102 stores a copy of the keys in the secure database. In addition, the digital verification system 102 sends the private key to the user's client device 104, as shown in act 408. More specifically, the digital verification system 102 sends the private key to the client device 104 for storage on the client device 104, which is shown in act 410.

As an addition part of creating a user lifetime value account, the digital verification system 102 also creates a lifetime value blockchain for the user, illustrated in act 412. For example, the digital verification system 102 initializes a lifetime value blockchain for the user's lifetime value account within the secure database. In this manner, the digital verification system 102 can add future transaction records to the user's lifetime value blockchain. Additional description regarding transaction records and lifetime value blockchains within the secure database is provided below in reference to FIG. 9.

Figure 5:
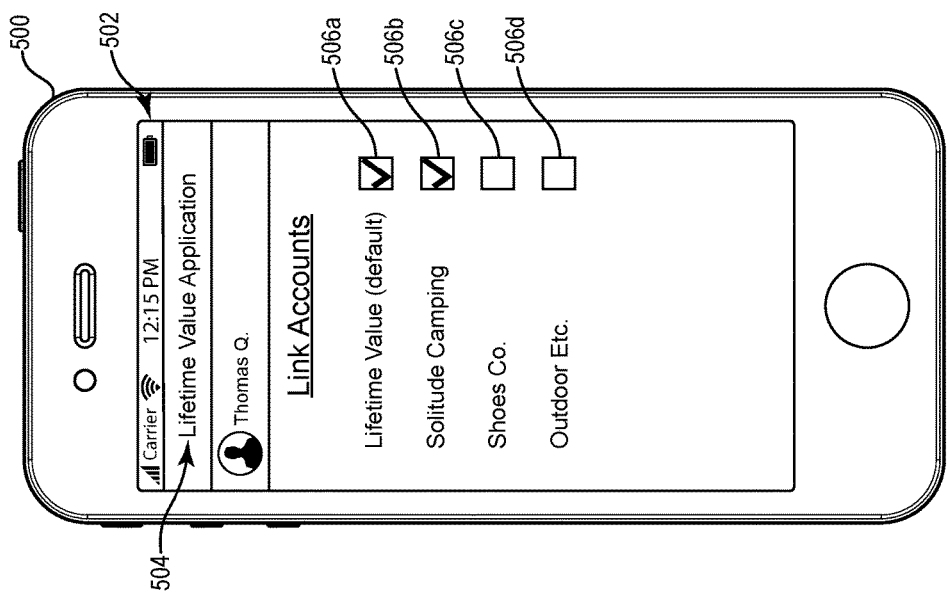
FIG. 5 illustrates an example graphical user interface for linking user lifetime value accounts on a client device in accordance with one or more embodiments.

In some embodiments, a user creates multiple lifetime value accounts. In these embodiments, the digital verification system 102 enables the user to link together their accounts. FIG. 5 illustrates an example graphical user interface for linking lifetime value accounts on a client device. Specifically, FIG. 5 illustrates a client device 500 presenting an example graphical user interface 502 that includes lifetime value accounts 506a-d of a user (e.g., consumer). For example, a lifetime value application 504 provides the graphical user interface 502. The client device 500 can be the same or similar to the client device 104 described with respect to FIG. 1.

As mentioned above, FIG. 5 shows a user having multiple lifetime value accounts. For example, a user has a default or lifetime value account 506a and three additional or alias accounts 506b-d. As shown, the default lifetime value account 506a is associated with the digital verification system 102, while the alias accounts 506b-d are associated with various third-party providers. In some instances, the user previously creates an account with a third-party provider, such as Solitude Camping or Outdoor Etc. If the third-party provider is an affiliate with the digital verification system 102, then the user can use their third-party provider account (i.e., an alias account) with the digital verification system 102. In these instances, the digital verification system 102 can create one or more lifetime value blockchains for each alias account.

Further, the user can link alias accounts with each other and/or with the default lifetime value account 506a. For example, as FIG. 5 illustrates the user links together the first alias account 506b (i.e., Solitude Camping) with the default lifetime value account 506a. Upon the user linking the two accounts, the digital verification system 102 confirms the link between two accounts. The confirmation process can be similar to the process of confirming a verification request. For example, before linking two lifetime value accounts, the LTV app 504 prompts and receives the user's credential. The LTV app 504 then creates a message to send to the secure database within the digital verification system 102 linking the two (or more) accounts. Like an authorized verification request, the LTV app 504 encodes the message with the user security token (e.g., private key).

By encoding the message that links the two (or more) accounts, the digital verification system 102 can authenticate that the user personally linked the accounts together. In other words, the request to link the accounts is cryptographically verifiable because the user's private key is used, which can only be used with the user's explicit authorization. In this manner, the digital verification system 102 can prove that two accounts, profiles, and/or devices belong to the same individual rather than employ statistical inferences that suggest that the two belong to the same individual, which are prone to error. In some embodiments, the digital verification system 102 records the verified linked accounts in a device graph that maintains a record of user profiles/device interactions.

Upon linking two accounts, the digital verification system 102 can combine the lifetime value blockchains for the corresponding accounts into a single lifetime value blockchain. For example, upon the user linking the default lifetime value account 506a with the first alias account 506b, the secure database within the digital verification system 102 adds the transaction records from the lifetime value blockchain of the first alias account 506b to the lifetime value blockchain of the default lifetime value account 506a. In some embodiments, each transaction record includes data specifying the alias account to which the record belongs in the case that the user unlinks accounts and the digital verification system 102 separates the merged lifetime value blockchain according to their respective accounts.

Figure 6:
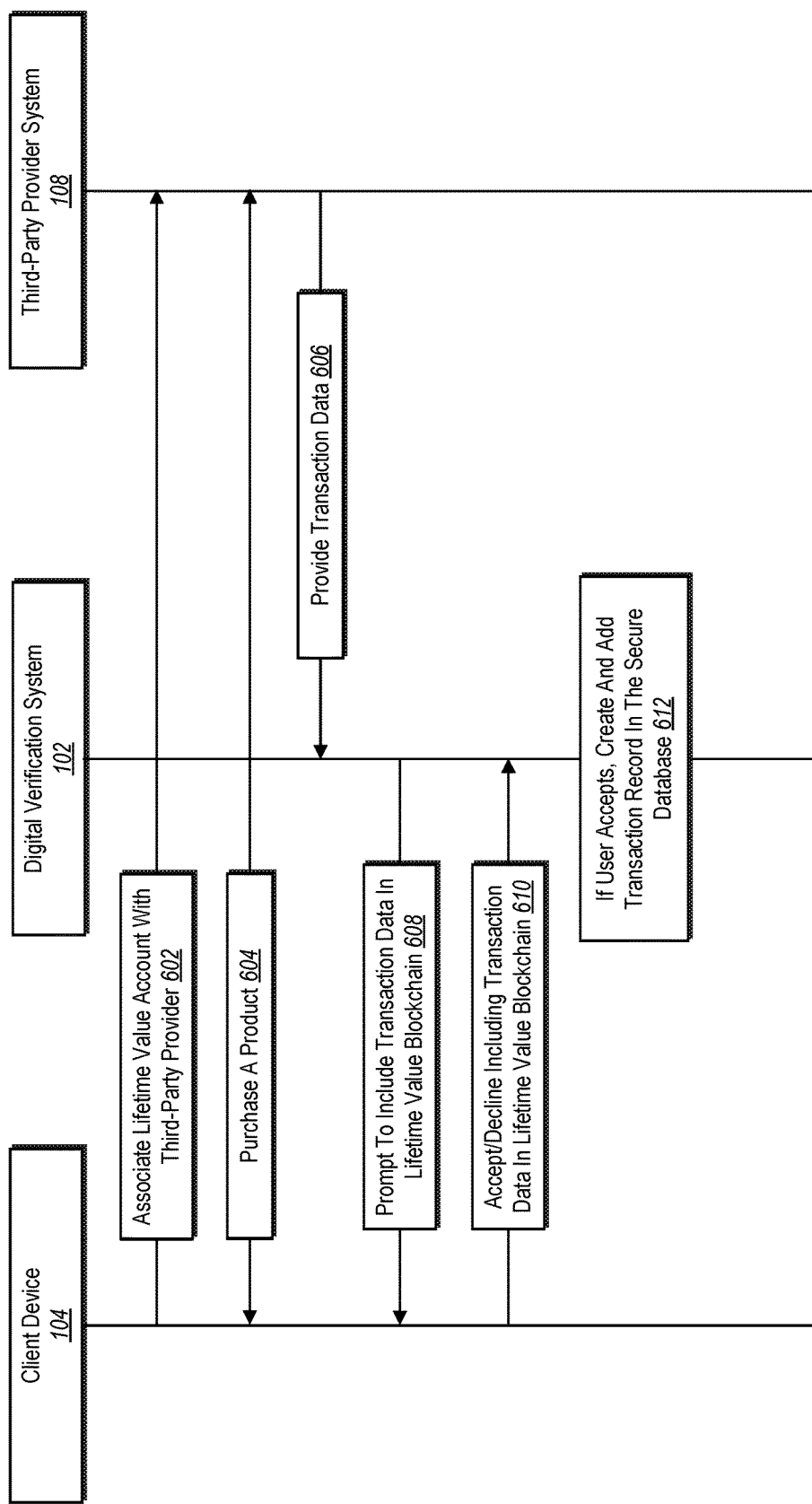
FIG. 6 illustrates an example sequence diagram of the digital verification system adding a transactional record to a user's lifetime value blockchain in accordance with one or more embodiments.
Figure 7:
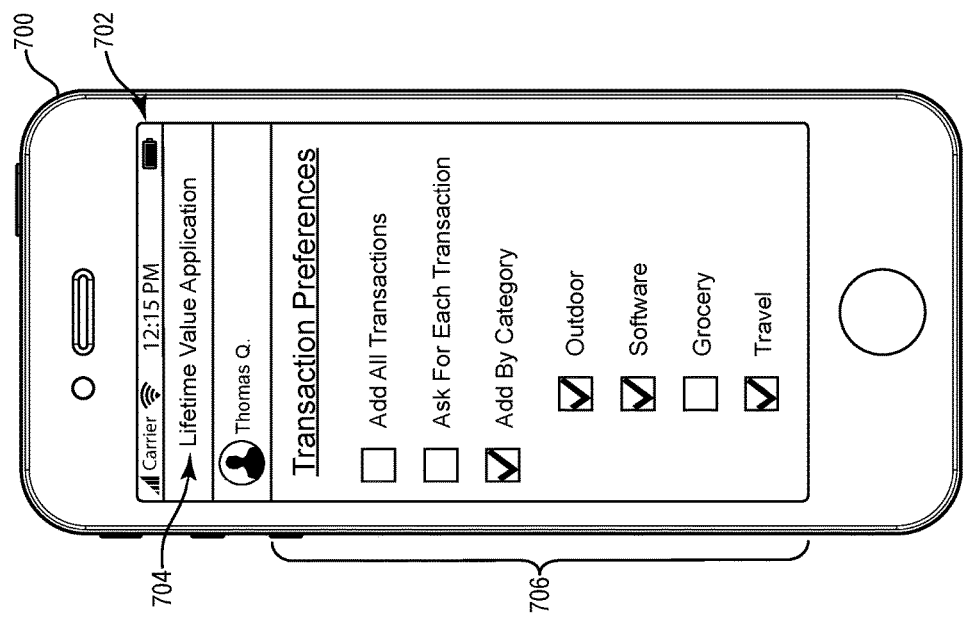
FIG. 7 illustrates an example graphical user interface for specifying transaction preferences on a client device in accordance with one or more embodiments.
Figure 8:
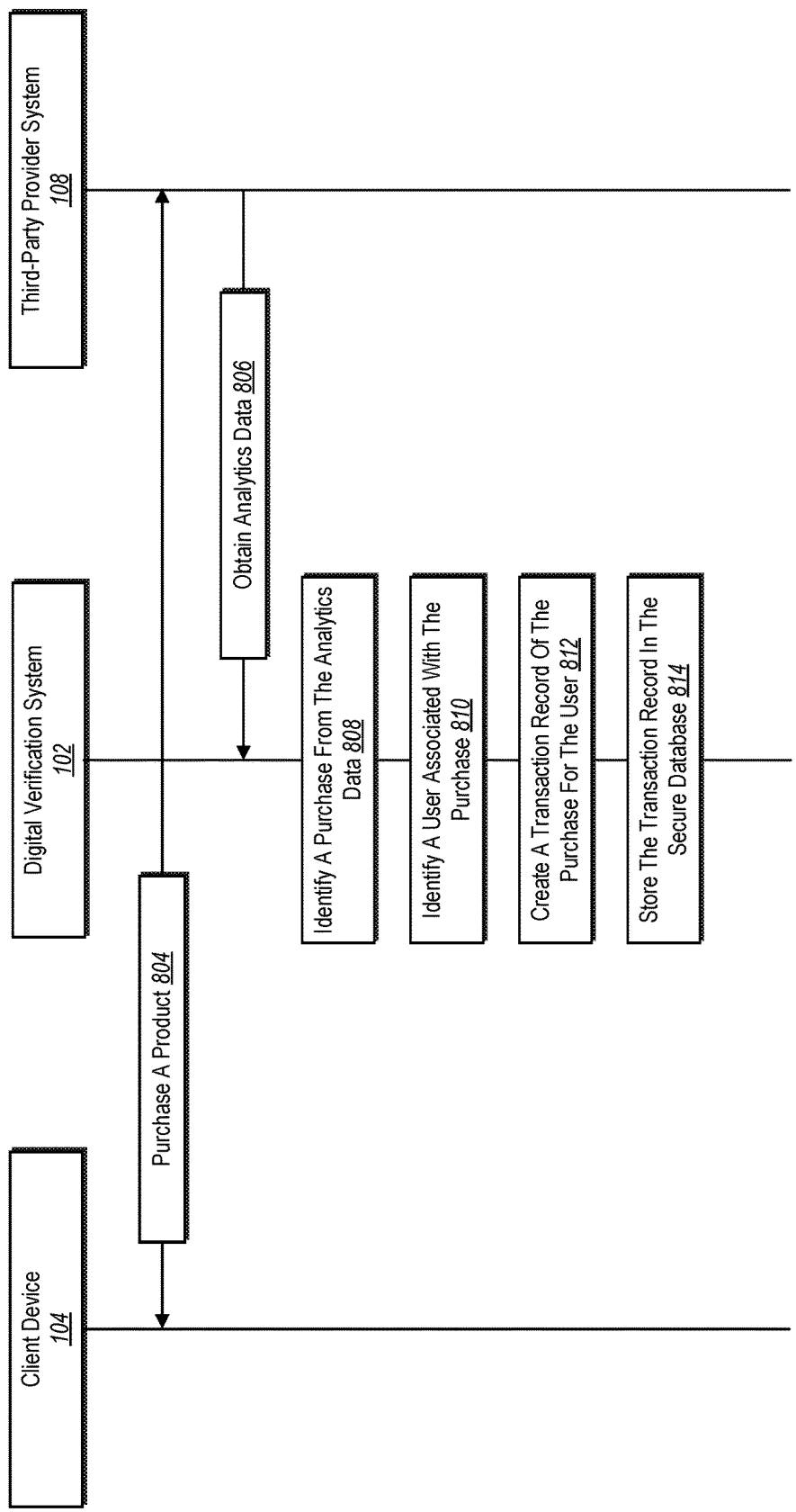
FIG. 8 illustrates another example sequence diagram of the digital verification system adding a transactional record to a user's lifetime value blockchain in accordance with one or more embodiments.

To successfully process verification requests related to a user, the digital verification system 102 adds transaction records to one or more blockchains associated with a user (e.g., the user's lifetime value blockchain). The digital verification system 102 can employ various methods and techniques to add transaction records to a user's lifetime value blockchain. FIGS. 6 and 7 illustrate adding transaction records to a user's lifetime value blockchain based on specific authorization of the user. FIG. 8 illustrates an alternative process of automatically adding transaction records to a user's lifetime value blockchain based on a general authorization of the user.

As mentioned above, FIG. 6 illustrates an example sequence diagram of the digital verification system adding a transactional record to a user's lifetime value blockchain under the control of the user. As shown, FIG. 6 includes the digital verification system 102 communicating with the client device 104 and the third-party provider system 108. The digital verification system 102, the client device 104, and the third-party provider system 108 may be examples embodiments of the digital verification system 102, the client device 104, and the third-party provider system 108 described above.

In act 602, the user, via the client device 104, associates their lifetime value account with the third-party provider system 108. For example, the user uses their lifetime value account credentials to log into the digital verification system 102. As another example, the user uses their third-party provider account, which serves as an alias account with the digital verification system 102, as described above. Further, as described above, the user can link their third-party provider account with their lifetime value account (e.g., default lifetime value account).

In act 604, the user purchases a product from the third-party provider system 108. In general, purchasing a product includes multiple communication exchanges between the client device 104 and the third-party provider system 108. To illustrate, the user browses one or more products from the third-party provider system 108. For example, the user browses within a third-party provider application or a website associated with the third-party provider. The user adds at least one product to an electronic shopping cart or similarly indicates an option to purchase the at least one product. Lastly, the user purchases the at least one product from the third-party provider by providing information that results in an electronic payment to the third-party provider in exchange for the at least one product.

After the user purchases a product, the third-party provider system 108 provides transaction data to the digital verification system 102, as shown in act 606. Transaction data can include, but is not limited to, a third-party provider identifier, a user identifier (e.g., a user identifier), the product(s) purchased, a timestamp of the transaction, and payment information (e.g., purchase amount). In some embodiments, the transaction data also includes categorical information (e.g., product category), client device information (e.g., a hardware and/or software profile), and/or location information associated with the client device (e.g., GPS coordinates). One will appreciate that transaction data may include any type of user profile information that is digitally confirmed/validated by the third-party provider system 108 at any point during the purchase process.

In act 608, the digital verification system 102 prompts the user on the client device 104 to include the transaction data in their lifetime value blockchain. For example, the digital verification system 102 sends the transaction data to the LTV app on the user's client device 104. The LTV app then prompts the user to save the transaction data to their lifetime value blockchain. For example, the LTV app provides a notification and/or an "approval" section that enables the user to manually approve whether to add the transaction data to their lifetime value blockchain. In response to receiving the prompt, the user accepts or declines to include the transaction data in their lifetime value blockchain, as shown in act 610 (e.g., by selecting an option to accept or decline that the client devices presents within the prompt).

In some embodiments, the LTV app, via the digital verification system 102, provides controls to a user that allows the user to specify which products to add to their lifetime value blockchain. Further, in the case that the user has multiple lifetime value blockchains, the LTV application enables the user to select the particular lifetime value blockchain to which to add the transaction data. For example, in one or more embodiments, the digital verification system 102 maintains a "hidden" lifetime value blockchain to which the user can add particular transactions as part of their cumulative lifetime value, but where details of the particular transactions are kept private. As another example, the digital verification system 102 maintains various lifetime value blockchains for a user corresponding to third-party providers, product category, location, brand preference, etc.

Although not shown in FIG. 6, in the event that the user declines the prompt to add transaction data to a lifetime value blockchain, then the digital verification system 102 can disregard the transaction data. If, however, the user accepts the prompt, the digital verification system 102 creates a transaction record and adds it to the user's lifetime value blockchain within the secure database, as shown in act 612 of FIG. 6. In particular, in one or more embodiments, the digital verification system 102 provides the transaction data to the secure database, and the secure database creates a transaction record and appends the record to the user's lifetime value blockchain. The transaction record can include a portion, or all, of the data provided within the transaction data from the third-party provider system 108. By appending the transaction record to the user's lifetime value blockchain, the digital verification system 102 can subsequently perform lifetime value verifications for the user, as described in detail above.

While in some embodiments the user approves each transaction added to their lifetime value blockchain, in other embodiments the user specifies settings or preferences to control when transaction data from one or more third-party provider systems results in the digital verification system 102 adding a transaction record to the user's lifetime value blockchain. To illustrate, FIG. 7 shows a client device 700 providing an example graphical user interface 702 for specifying transaction preferences 706. As shown, the graphical user interface 702 is associated with a lifetime value application 704 ("LTV app 704") running on the client device 700. In addition, the client device 700 can be the same as or similar to the client devices 104 described with respect to FIG. 1.

As mentioned above, the graphical user interface 702 displays transaction preferences 706. Transaction preferences enable a user (e.g., consumer) to specify which transactions the digital verification system adds to the user's lifetime value blockchain. As shown, transaction preferences can include, but are not limited to, adding all transactions, adding only when the user opts-in or explicitly gives consent, or adding transactions from defined categories.

In one or more embodiments, and as shown in FIG. 7, a user can select the option to "Add All Transactions" in the transaction preferences 706. Based on receiving a user selection indicating that a user has selected the "Add All Transactions" option, the digital verification system 102 automatically (e.g., without addition user input or authorization from the user) creates transaction records to append to the user's lifetime value blockchain when transaction data is received from a third-party provider system. This option simplifies the user experience by operating without further user intervention. Moreover, because the user maintains control over the sharing of the transaction information, and because increased lifetime values can result in the user qualifying for greater benefits from third-party providers, users may be more inclined to allow the digital verification system to track all transactions for the user.

The second option, "Ask For Each Transaction," in the transaction preferences 706 indicates the user's preference for the digital verification system to prompt the user each time transaction data is received from a third-party provider system. In this manner, the user controls all information that is added to their lifetime value blockchain (as described above with respect to FIG. 6). By controlling which transaction data is added to their lifetime value blockchain, the user also controls what information can be shared with other third-party providers. Stated differently, the digital verification system enables users to control both the data that is collected as well as the data that is shared.

As another option, the transactions preferences 706 can include an "Add By Category" that allows a user to pre-authorize the digital verification system 102 to create and add transaction records for only specific categories of transaction data. For example, as shown in FIG. 7, based on receiving the user selections of the "Outdoor," "Software," and "Travel" categories, the digital verification system 102 will create and add transaction records for outdoor purchases, software purchases, and travel purchases. Likewise, the digital verification system 102 will not add transaction records for grocery purchases because the user has not selected the "Grocery" category. Additionally, or alternatively, each category links to a corresponding lifetime value blockchain. For instance, if a user purchases a sleeping bag, the digital verification system creates and adds a transaction record to an outdoors lifetime value blockchain. In some embodiments, the digital verification system adds a transaction record to multiple lifetime value blockchains belonging to a user.

While FIG. 7 illustrates various options for adding transactions to a user's lifetime value blockchain(s), one will appreciate that other options are possible. For example, the transaction preferences 706 include options to add transaction records based on transaction type, amount, time period, brand preference, size preference, etc.

In addition, the digital verification system, through the LTV app 704 for example, can enable a user to edit transaction records included in a lifetime value blockchain. For instance, the LTV app 704 provides an interface that allows a user to move a transaction record between lifetime value blockchains, such as move a transaction to the "hidden" blockchain or "favorites" blockchain. Further, the digital verification system 102 can enable a user to delete a transaction record, or a portion thereof. However, the digital verification system 102 cannot enable a user to add a previous transaction record unless the third-party provider system to which the transaction corresponds re-validates the information within the transaction record.

As mentioned above, FIG. 8 relates to automatically creating and adding transaction records to a user's lifetime value blockchain by deriving transaction data from an analytics pipeline. In particular, FIG. 8 illustrates another example sequence diagram of the digital verification system 102 adding a transaction record to a user's lifetime value blockchain. As shown, FIG. 8 includes the digital verification system 102 communicating with a client device 104 and the third-party provider system 108. The digital verification system 102, the client device 104, and the third-party provider system 108 in FIG. 8 may be examples embodiments of the digital verification system 102, the client device 104, and the third-party provider system 108 described above.

In act 804, as shown in FIG. 8, the user (e.g., consumer) purchases a product from the third-party provider system 108. Act 804 may be similar to act 604 of FIG. 6 described previously. As mentioned above, purchasing a product generally includes multiple communication exchanges between the client device 104 and the third-party provider system 108. Further, act 804 can include multiple instances of the user using the client device 104 to purchase products from the third-party provider system 108.

In act 806, the digital verification system 102 obtains analytics data (e.g., transaction data) from the third-party provider system 108. For example, the digital verification system 102 obtains analytics data from the third-party provider system 108 and/or a third party that provides an analytics pipeline from the third-party provider system 108 to the digital verification system 102. Examples of analytics data include, but are not limited to, transaction data, click data, viewing data, device data, and user data.

Upon obtaining the analytics data, the digital verification system identifies a purchase from the analytics data, as shown in act 808. In particular, the digital verification system 102 identifies a block of data containing a purchase or a transaction identifier within the analytics data that indicates a purchase by a user. In the case that the analytics data includes data from multiple third-party provider systems, the digital verification system 102 may also determine that the transaction is from a particular third-party provider system based on identifying the third-party provider identifier for the particular third-party provider system.

The digital verification system 102 also identifies a user associated with the purchase, as act 810 illustrates. For example, the digital verification system 102 identifies the user identifier for a user linked to the transaction. In some embodiments, the digital verification system 102 identifies the user identifier of an alias account (described above) linked to the user.

In one or more embodiments, as part of identifying the user associated with the purchase, the digital verification system 102 first receives authorization to track transactional information associated with the user. In some instances, the user provides authorization to the digital verification system 102 upon creating a lifetime value account. Additionally, and/or alternatively, the digital verification system 102 prompts the user to provide authorization to automatically track user transactions, and add transaction records to the user's lifetime value blockchain. Further, the user may withdraw authorization for the digital verification system 102 to track their transaction information at any time.

Once the digital verification system 102 identifies transaction data that is associated with both the third-party provider system 108 and the user, the digital verification system 102 creates a transaction record of the purchase for the user, as act 812 illustrates. Further, as shown in act 814, the digital verification system 102 stores the transaction record in the secure database. Creating a transaction record from transaction data and adding the transaction record to a user's lifetime value blockchain within the secure database is described above in connection with act 612 of FIG. 6.

As described in connection with FIG. 8, in one or more embodiments, the digital verification system 102 automatically detects user transactions, creates transaction records, and adds the transaction records to the user's lifetime value blockchain. In some embodiments, the digital verification system 102 enables the user to select filters or preferences as to which transactions the digital verification system 102 automatically adds. For example, the digital verification system 102 enables a user to set categorical preferences as described above with reference to FIG. 7. Further, in some embodiments, the digital verification system 102 enables the user to manage, edit, move, and/or remove specific transaction records, as described above.

In some embodiments, the digital verification system 102 identifies a transaction having a known third-party provider identifier, but an unknown user identifier. In these embodiments, the digital verification system 102 creates a new lifetime value blockchain for the unknown user identifier. If at a later time, a user provides an alias that matches the unknown user identifier, the digital verification system 102 can associate the previously created blockchain with the user. In this manner, a user can add previously validated purchases information to their lifetime value blockchain after the time of the actual transaction.

As briefly mentioned above, FIG. 9 illustrates a schematic diagram of an example secure database 900 of the digital verification system. The secure database 900 may be an example of the secure database described above, including the secure database 114 described with respect to FIG. 1. For example, the secure database 900 communicated with the lifetime value valuation interface 112 to add and create transaction records as well as perform lifetime value verifications.

In general, the secure database 900 is a database with a secured-service layer wrapped around the database that separates the database from the LTV interface of the digital verification system. In addition, one or more computing devices (e.g., server devices 101 from FIG. 1) implement the secure database 900. For example, in addition to securely storing data, the secure database 900 performs the operations described herein in a secure environment where user data is safeguarded and protected.

Figure 9:
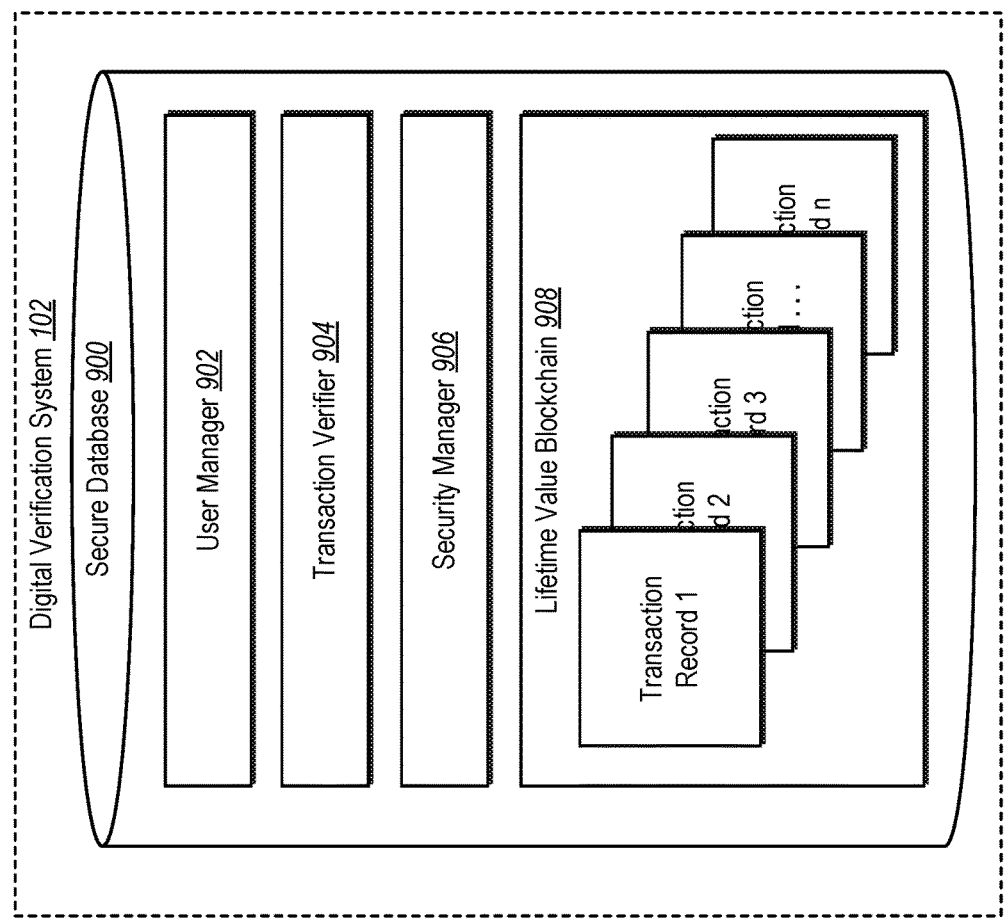
FIG. 9 illustrates a schematic diagram of an example secure database of the digital verification system in accordance with one or more embodiments.

As shown in FIG. 9, the secure database 900 includes various components for performing the processes and features described herein. For example, in the illustrated embodiment, the secure database 900 includes a user manager 902, a transaction verifier 904, a security manager 906, and a lifetime value blockchain 908. The components 902-908 of the secure database 900 can comprise software, hardware, or both. For example, the components 902-908 can comprise one or more instructions stored on a computer-readable storage medium and executable by processors of one or more computing devices, such as a client device or server device. When executed by the one or more processors, the computer-executable instructions of the secure database 900 can cause the computing device(s) to perform the feature learning methods described herein. Alternatively, the components 902-908 can comprise hardware, such as a special purpose processing device to perform a certain function or group of functions. Alternatively, the components 902-908 of the secure database 900 can comprise a combination of computer-executable instructions and hardware.

As mentioned above, the secure database 900 includes a user manager 902. In general, the user manager 902 maintains user accounts. As described above, the user manager 902 facilitates creating a lifetime value account for a user, initializing a user's lifetime value blockchain, and providing recovery information to a user. In one or more embodiments, the user manager 902 provides a Registration API that enables a user to create, manage, edit, and delete their lifetime value account(s). In some embodiments, a user accesses the Registration API using the LTV app on a client device that securely communicates with the user manager 902.

The user manager 902 also enables a user to link and unlink alias accounts. For example, the user manager 902 provides an Alias API that enables users to link and merge an alias account with a lifetime value account or link two alias accounts together. Like the Registration API, in some embodiments, the Alias API can securely communicate through an encrypted communication link with the LTV app to enable a user to control their alias preferences, as described above with respect to FIG. 5.

Furthermore, the user manager 902 facilitates adding transactions to the secure database 900. As described above, the secure database 900 creates and adds transaction records to a user's lifetime value blockchain 908 within the secure database 900. As such, the user manager 902 receives and analyzes transaction data from third-party providers to identify transaction data for a user. For example, the user manager 902 parses incoming data from a third-party provider system to identify blocks of data that include a user identifier along with other information that is confirmed by a third-party provider system.

Moreover, and as described above, the user manager 902 creates a transaction record and appends the transaction record to the user's lifetime value blockchain 908. In some embodiments, the user manager 902 creates a new lifetime value blockchain for each user and per each third-party provider. In one or more further embodiments, as also provided above, the user manager 902 enables the user to merge and combine lifetime value blockchains based on various considerations (e.g., category of products).

In one or more embodiments, the user manager 902 uses hashing or encryption when adding a new transaction record to a user's lifetime value blockchain. By hashing, encrypting, or otherwise encoding each new transaction record, the user manager 902 adds additional security and protection to user data stored in the secure database 900. When the user manager 902 encrypts a new transaction record, the user manager 902 encrypts the transaction record using the user's private key (with or without salt) or, the user manager 902 uses a separate key to encrypt the new transaction record.

In general, the transaction verifier 904 processes verification requests from third-party providers authenticated by a user. For example, the transaction verifier 904 provides a Verification API that enables the user's client device to securely communicate with the transaction verifier 904. As described above, upon receiving the verification request, the transaction verifier 904 confirms that the user authorizes the verification request. In particular, the transaction verifier 904 confirms that the verification request is encrypted with the user's security token (e.g., a private key) stored on the user's client device. As provided previously, the client device only encodes the verification request upon the user actively affirming to forward the verification request from a third-party provider to the digital verification system. Further, as part of confirming that the user authorized the verification request, the transaction verifier 904 decodes the verification request. In particular, the transaction verifier 904 uses a paired security token (e.g., a public key) from the secure database 900 that corresponds to the security token (e.g., the private key) stored on the user's client device.

Upon decoding the verification request, the transaction verifier 904 identifies arguments and parameters of the request. The arguments include required information to perform the verification, such as threshold amount to compare against the user's lifetime value amount within one or more blockchains. In some instances, the argument also includes a third-party provider identifier that identifies the third-party provider system making the verification request. Examples of parameters include, but are not limited to, one or more categories, time ranges, location information, device requirements, etc. For instance, a verification request may inquire whether the user has spent over $500 in outdoor products in the last two years. Here, the argument is the $500 spending amount, and the parameters are the outdoor products category and within a time range of the last two years. One will appreciate that the arguments and parameters can vary based on the LTV offer extended by a third-party provider.

In one or more embodiments, the user specifies additional parameters. For example, a user limits a verification request to one or more categories or within a specified time period. In some embodiments, the user defines a set of preferences that apply to each verification request. Overall, the transaction verifier 904 enables the user to limit what information the user shares with a third-party provider, and as such, the user is free to further impose additional parameters on verification requests. In some instances, however, by limiting the information a user is willing to share, the user misses out of one or more LTV offers for which the user might otherwise qualify.

To further process a verification request, the transaction verifier 904 accesses the user's lifetime value blockchain 908 and compares the request against the user's stored data (e.g., transaction records). The request may be for numeric comparison or another type of data verification (e.g., location verification, device usage verification, etc.), as described above. In some embodiments, the transaction verifier 904 compares the arguments against pre-calculated lifetime values stored in a user's lifetime value blockchain. In alternative embodiments, the transaction verifier 904 recalculates a relevant lifetime value before comparing it to the arguments in the verification request. For example, if the verification request is for a purchase history amount, then the transaction verifier 904 calculates a purchase history lifetime value. In another example, if the verification request is for a geographic location requirement, the transaction verifier 904 determines the user's current salary as stored in the user's lifetime value blockchain.

After processing the verification request, the transaction verifier 904 provides the result of the request to the third-party provider system. The transaction verifier 904 generally returns a Boolean result indicating that the request was verified or not verified, as described above. In some embodiments, the transaction verifier 904 provides a non-Boolean result, such as a result indicating that the user fits in a particular category. Further, the transaction verifier 904 encodes the result to prevent unwanted parties from intercepting the result.

The security manager 906 provides security measures for the secure database 900. In particular, the security manager 906 creates security tokens for each user and/or user account. For example, in one or more embodiments, upon a user creating a lifetime value account, the security manager 906 creates a private key and a corresponding public key, where the public key can decrypt communications encrypted with the private key. The security manager 906 then provides the private key to the user's client device and stores the public on the secure database 900.

The security manager 906 also manages security tokens. For example, before a user links two accounts (e.g., a lifetime value account and an alias account), the two accounts may each have their own security token set. Upon linking the two accounts, the security manager 906 may choose one of the security token sets to apply to both accounts, or creates a new set of security tokens for the merged account. Upon determining a new set of security tokens, the security manager 906 provides the user security token to the user's client device(s) and stores the other security token.

The lifetime value blockchain 908 stores transaction records for each user. As shown, the lifetime value blockchain 908 creates a blockchain by appending additional transaction records to previous transaction records. In this manner, the lifetime value blockchain 908 can quickly add new transaction records to a user's lifetime value blockchain as well as retrieve transaction data when processing a verification request. In addition, because each transaction record is individually encoded, the lifetime value blockchain provides additional security to a user in protecting their private data.

In one or more embodiments, the lifetime value blockchain 908 stores one lifetime value blockchain per user account. In some embodiments, the lifetime value blockchain 908 stores a separate lifetime value blockchain for each user account and per third-party provider. As described above, in some embodiments, the lifetime value blockchain 908 stores multiple lifetime value blockchains for a user as specified by the user.

The lifetime value blockchain 908 also stores a user's transactions. In general, the user's transaction records are only stored in the secure database 900 and not on the user's client device. In this manner, the secure database 900 can prevent users or other parties from tampering with data and compromising the verifiability of the data. Stated differently, by maintaining the user's transaction records in the secure database 900, the secure database 900 ensures that the user's transaction records are secured and digitally verifiable, this providing a benefit to both users and third-party providers.

In addition to the various embodiments described with regard to FIGS. 1-9, one or more embodiments can also be described in terms of a method that includes one or more steps. For example, the digital verification system can perform a method that comprises a step of determining whether a user (e.g., user) satisfies a lifetime value verification. In one or more embodiments, the step for determining whether the user satisfies the lifetime value verification includes identifying a threshold value to verify by decoding a verification request. As one example, and as described further above, the digital verification system employs a secure database to decode the verification request using a security token associated with the user. Once decoded, the secure database processes the verification request to identify arguments and parameters, which can include a lifetime value amount or threshold value.

In addition, the step of determining whether the user satisfies the lifetime value verification includes analyzing digitally verifiable information associated with the user to generate a user lifetime value. In particular, in some embodiments, the step of determining whether the user satisfied the lifetime value verification includes the digital verification system causing a secure database to lookup transaction records associated with the user. Upon accessing the user's transaction records, the secure database generates a lifetime value according to any parameters within the verification request. For example, if the parameters specify a category of goods or a time frame, the secure database factors these parameters into the user's lifetime value calculation. In these instances, the step for determining whether the user satisfies the lifetime value verification can include identifying a parameter within the verification request that limits the digitally verifiable transaction information to be considered in determining the user's lifetime value, where the at least one parameter includes at least one of a transaction type, a product category, or a range of time.

The step of determining whether the user satisfies the lifetime value verification also includes determining that the user lifetime value meets or exceeds the threshold value. For instance, in one or more embodiments, the secure database compares the calculated lifetime value to the identified threshold amount, as described above, to determine if the calculated lifetime value is greater or lesser than the identified threshold amount. If the calculated lifetime value is greater than (or equals) the identified threshold amount, then the lifetime value verification is satisfied. Otherwise, the lifetime value verification is not satisfied.

In one or more embodiments, the step for determining whether the user satisfies the lifetime value verification includes identifying a threshold value within the verification request by parsing information within the verification request. For example, and as described above, the digital verification system receives a lifetime value verification request with corresponding arguments and parameters. The digital verification system can analyze and parse the verification request to identify each argument and parameter, which the digital verification system uses to process the request.

Further, in some embodiments, the step for determining whether the user satisfies the lifetime value verification includes identifying a user lifetime value by accessing digitally verifiable information within a blockchain associated with the user. For example, the digital verification system parses out an identifier for the user found within the lifetime value verification request. Alternatively, the digital verification system obtains the identifier in connection with receiving the request.

Using the user's identifiers, the digital verification system accesses one or more lifetime value blockchains associated with the user, as described above. For instance, the digital verification system loads a user's lifetime value blockchain from a secure database. Once loaded, the digital verification system identifies or calculates the user's lifetime value as provided within the user's lifetime value blockchain. Stated differently, the digital verification system employs the digitally verifiable transaction information from within a lifetime value blockchain to identify a user's lifetime value.

The step of determining whether the user satisfies the lifetime value verification, in some embodiments, also includes determining that the user satisfies the lifetime value verification by comparing a threshold value to the user lifetime value. For example, as described above, the digital verification system performs a comparison on the user's lifetime value obtained from the user's lifetime value blockchain to the threshold value parsed out of the lifetime value verification request. The digital verification system then determines whether the user satisfies the lifetime value verification based on the comparison, as provided above.

In one or more embodiments, the step of determining whether the user satisfies the lifetime value verification also includes receiving digitally verifiable transaction information corresponding to the user based on the user an authorization received from the user and adding the digitally verifiable transaction information to the blockchain associated with the user. For example, when the user participates in a transaction with a third-party provider, the third-party provider sends digitally verifiable transaction information to the digital verification system. The digital verification system then adds the digitally verifiable transaction information to the user's lifetime value blockchain, as described above.

FIGS. 1-9, the corresponding text, and the examples provide a number of different systems and devices in accordance with one or more embodiments of a digital verification system. In addition to the foregoing, one or more embodiments can also be described in terms of flowcharts comprising acts in a method for accomplishing a particular result. For example, FIGS. 10-11 illustrate flowcharts of exemplary methods in accordance with one or more embodiments.

Figure 10:
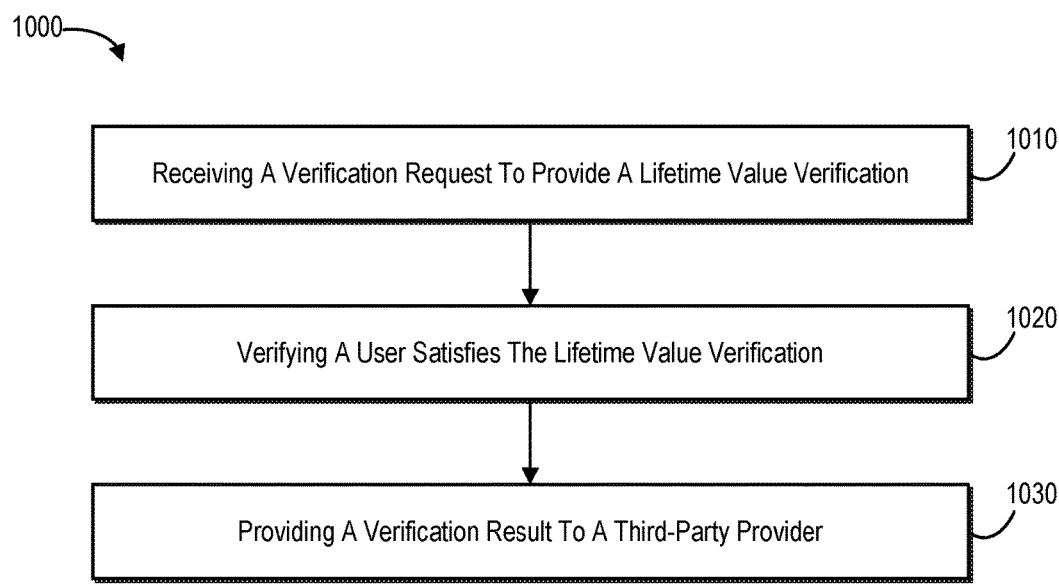
FIG. 10 illustrates an example flow diagram of a method for verifying a lifetime value of a user in accordance with one or more embodiments.
Figure 11:
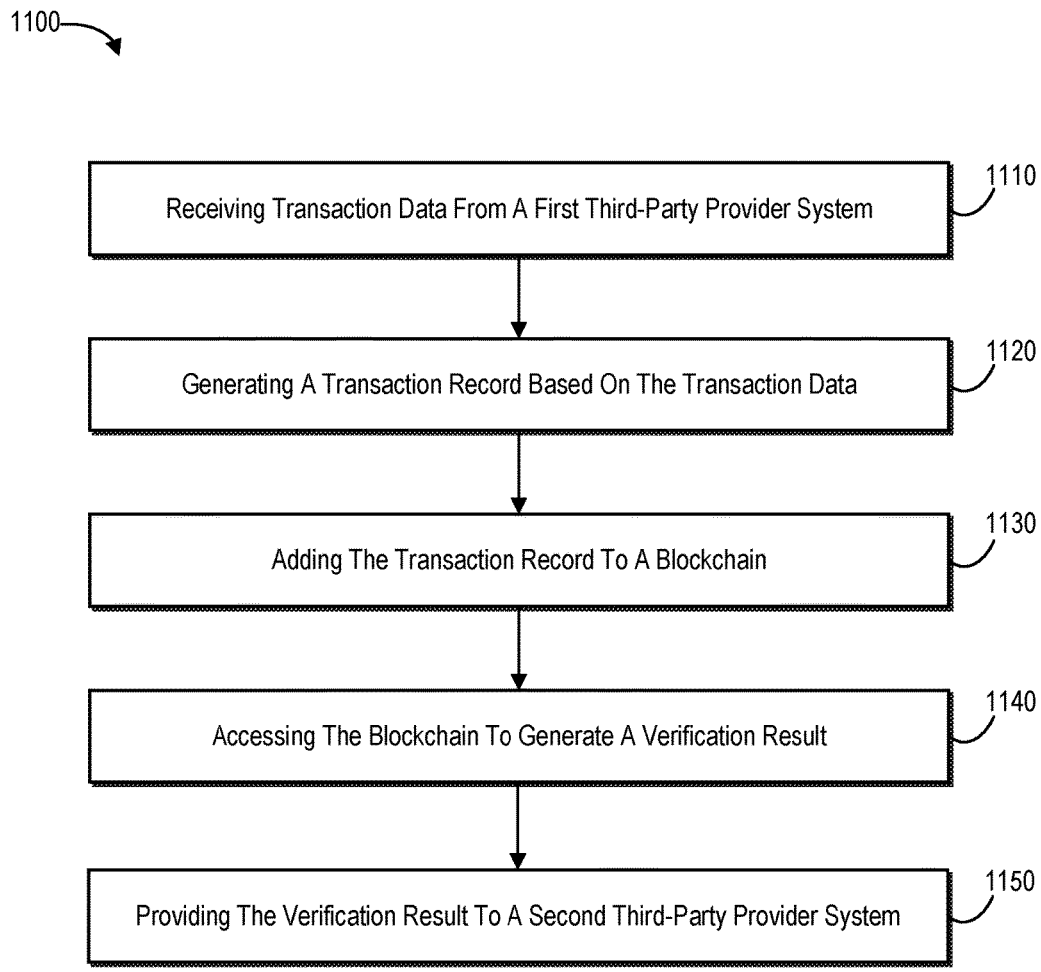
FIG. 11 illustrates another example flow diagram of a method for adding digitally verifiable information to a user's lifetime value blockchain in accordance with one or more embodiments.

FIG. 10 illustrates a flowchart of a series of acts in a method 1000 for verifying a user's lifetime value in accordance with one or more embodiments disclosed herein. More specifically, FIG. 10 illustrates a flowchart of a series of acts in a method 1000 for verifying a user's digital transaction history. In one or more embodiments, the method 1000 is implemented in a digital medium environment for allowing a user to control sharing of their personal and private information. Further, one or more computing devices described herein can implement a digital verification system that implements the method 1000.

The method 1000 includes an act 1010 of receiving a verification request to provide a lifetime value verification. In particular, the act 1010 can involve receiving, from a client device associated with a user, an encoded verification request to provide a lifetime value verification of the user to a third-party provider, where the user directly authorizes the encoded verification request. In some embodiments, the act 1010 also involves decoding the encoded verification request. For example, the act 1010 includes decoding the encoded verification request using a related security token that corresponds to a private security token on the user's client device used to encode the verification request.

As shown in FIG. 10, the method 1000 further includes an act 1020 of verifying that a user satisfies the lifetime value verification. In particular, the act 1020 can involve verifying that transactions within digitally verifiable information associated with the user satisfies the lifetime value verification threshold value from the verification request. For example, the act 1020 can involve comparing a lifetime value from the accessed digitally verifiable information to the threshold value from the verification request to determine whether the lifetime value associated with the user meets or exceeds the threshold value from the verification request.

Additionally, the method 1000 includes an act 1030 of providing a verification result to a third-party provider. In particular, the act 1030 can involve providing a verification result indicating that the user satisfies the lifetime value verification or indicating that the user does not satisfy the lifetime value verification to a computing device associated with the third-party provider. The act 1030 can also include generating a binary result that indicates whether the verification request is satisfied. In one or more embodiments, the act 1030 involves obfuscating the binary result before providing the binary result to the client device associated with the third-party provider. In some embodiments, the result indicates that the verification request is satisfied such that the third-party provider extends an offer to the user upon receiving the result.

The method 1000 can also include a number of additional acts. For example, the method 1000 can involve the act of identifying or parsing out, within the value verification request, at least one user input parameter limiting the digitally verifiable transaction information used in determining whether the accessed digitally verifiable information associated with the user satisfy the verification request. Examples of an input parameter include a transaction type, a product category, or a range of time. Method 1000 can also involve an act of receiving digitally verifiable transaction information corresponding to the user based on the user an authorization received from the user, and adding the digitally verifiable transaction information to the blockchain associated with the user.

Method 1000 can further involve an act of providing an application to the client device associated with a user. In this act, the application can prompt the user to authorize the lifetime value request to perform the lifetime value verification for the third-party provider, receive user input that verifies an identity of the user at the client device associated with the user, and encode the verification request with a private security token based on user input verifying the identity of the user.

FIG. 11 illustrates a flowchart of a series of acts in another method 1100 for allowing a user to control sharing of personal information in accordance with one or more embodiments disclosed herein. In one or more embodiments, the method 1100 is implemented in a digital medium environment for allowing a user to control the sharing of their personal information. Further, one or more computing devices described herein can implement a digital verification system that implements the method 1100.

As shown in FIG. 11, the method 1100 includes an act 1110 of receiving transaction data from a first third-party provider system. In particular, the act 1110 can involve receiving transaction data transaction data in response to a user interacting with the first third-party provider system. For example, the act 1110 can involve receiving analytics data or cloud data from the first third-party provider that includes transaction data from various users. Further, the act 1110 can involve identifying transaction data from the analytics data based on identifying a transaction including a user identifier associated with the user.

The method 1100 also includes an act 1120 of generating a transaction record based on the transaction data. In particular, the act 1120 can involve generating, based on an authorization to track transaction information, a transaction record using the transaction data received from the first third-party provider. The act 1120 can also involve extracting the transaction data from the analytics data corresponding to the user and the identified transaction. In one or more embodiments, the act 1120 includes receiving, from the client device associated with a user, a user preference defining the transaction data used in generating the transaction record. In some embodiments, the user preference provides authorization to generate transaction records for all transaction data of the user. In some embodiments, the user preference requests user authorization for each received instance of transaction data. In other embodiments, the user preference provides authorization to generate transaction records for at least one category of transaction data associated with the user.

Additionally, the method 1100 includes an act 1130 of adding the transaction record to a lifetime value blockchain. In particular, the act 1130 can involve adding, within a secure database, the transaction record to a blockchain associated with the user by appending the transaction record to one or more previously added transaction records. The act 1130 can also involve encoding the digitally verifiable record before adding the digitally verifiable record to the lifetime value blockchain associated with the user.

As shown in FIG. 11, the method 1100 further includes an act 1140 of accessing the blockchain to generate a verification result. In particular, the act 1140 can involve, in response to receiving a verification request corresponding to a second third-party provider, accessing the blockchain to generate a verification result that is based at least in part on the transaction record generated using the transaction data received from the first third-party provider. For example, the act 1140 includes receiving an authorized lifetime value verification request associated with the second third-party provider.

The method 1100, as shown in FIG. 11, further includes an act 1150 of providing the verification result to a second third-party provider. Furthermore, the method 1100 can also include a number of additional acts. For example, the method 1100 can involve an act of receiving an indication from the user to combine the lifetime value blockchain associated with the user with an additional lifetime value blockchain associated with the user. In this act, the indication from the user can be encoded using a private security token stored on the client device associated with the user such that the indication is cryptographically sent by the user. Further, in this act, the indication from the lifetime value blockchain associated with the user can be associated with the first third-party provider and the additional lifetime value blockchain associated with the user is associated with the second third-party provider.

Embodiments of the present disclosure may comprise or utilize a special purpose or general-purpose computer including computer hardware, such as, for example, one or more processors and system memory, as discussed in additional detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media accessible by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives, Flash memory, phase-change memory, other types of memory, other optical disk storage, magnetic disk storage or other magnetic storage devices, or any other medium that is used to store desired program code means in the form of computer-executable instructions or data structures, and that is accessible by a general purpose or special purpose computer.

The term "digital environment," as used herein, generally refers to an environment that is implemented, for example, as a stand-alone application (e.g., a personal computer or mobile application running on a computing device), as a module of an application, as a plug-in for an application, as a library function or functions that may be called by a network application creation system, and/or as a cloud-computing system.

Computer-executable instructions comprise, for example, instructions and data which, when executed by a processor, cause a general purpose computer, special-purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methods, it is to be understood that the subject matter defined in the appended claims is not necessarily limited to the described features or acts described above. Rather, the described features and acts are disclosed as example forms of implementing the claims.

Figure 12:
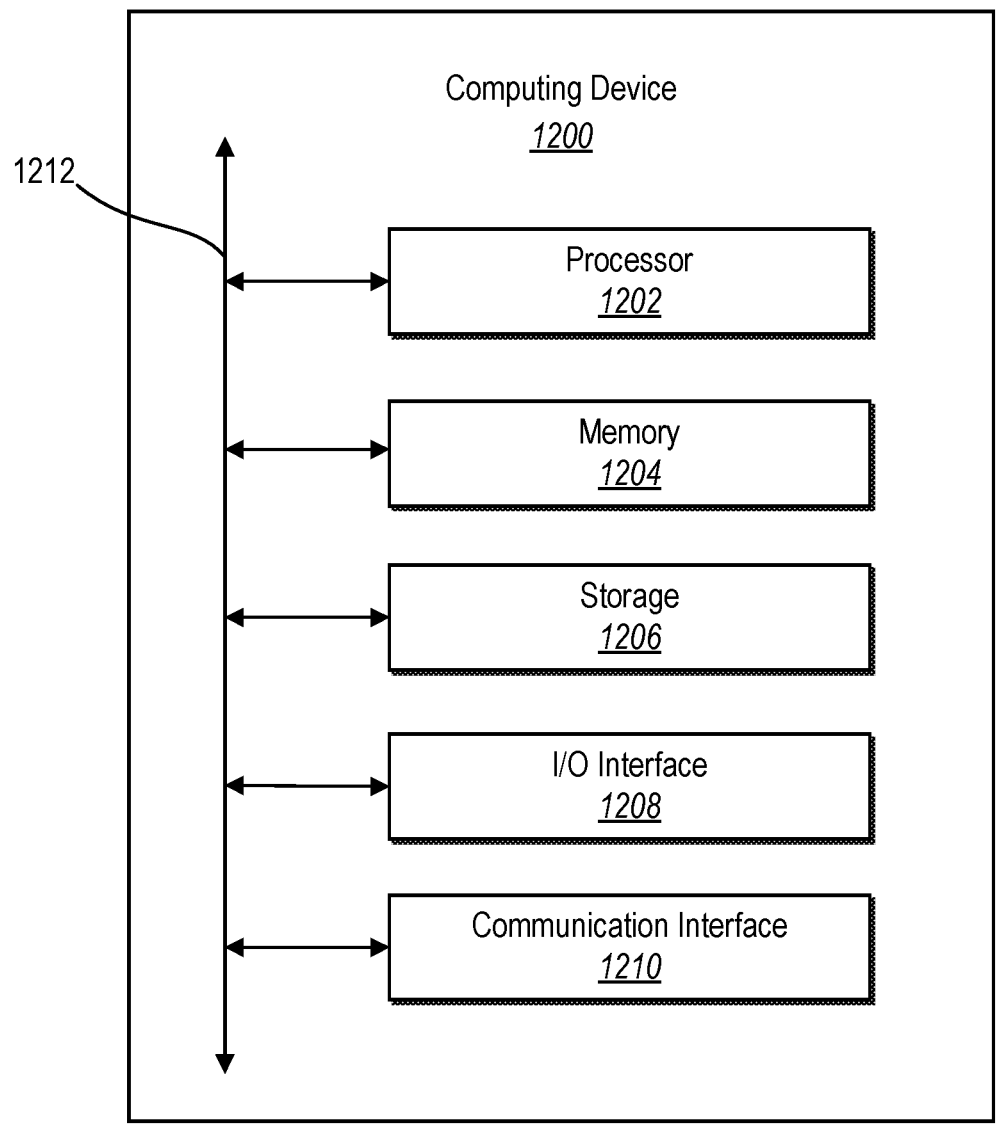
FIG. 12 illustrates a block diagram of an exemplary computing device in accordance with one or more embodiments.

FIG. 12 illustrates a block diagram of an exemplary computing device 1200 that may be configured to perform one or more of the processes described above. One will appreciate that one or more computing devices, such as the computing device 1200 may host the digital verification system 102 and/or secure database 114, 900. Alternatively, the computing device 1200 may include a device (e.g., client device 104, 200, 500, 700) that communicates with the digital verification system 102, secure database 114, 900, and/or third-party provider system 108. In one or more embodiments, the computing device 1200 may be a mobile device (e.g., a mobile telephone, a smartphone, a PDA, a tablet, a laptop, a camera, a tracker, a watch, a wearable device, etc.). In some embodiments, the computing device 1200 may be a non-mobile device (e.g., a desktop computer, server computer, or another type of client device).

As shown in FIG. 12, the computing device 1200 can comprise one or more processor(s) 1202, memory 1204, a storage device 1206, an input/output ("I/O") interface 1208, and a communication interface 1210, which may be communicatively coupled by way of a communication infrastructure (e.g., bus 1212). While an exemplary computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example and not by way of limitation, to execute instructions, processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example and not by way of limitation, storage device 1206 can comprise a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

I claim:

1. In a digital environment for allowing users to control sharing of personal information, a method of verifying a digital transaction history of users, the method comprising:
   receiving, from a client device associated with a user, an encoded verification request to provide a lifetime value verification of the user to a third-party provider, wherein the encoded verification request is encoded with a private security token at the client device and directly authorized by the user at the client device associated with the user;
   determining whether the user satisfies the lifetime value verification based on:
      decoding the encoded verification request;
      identifying, within the verification request, a threshold value to verify;
      analyzing transaction records within a blockchain associated with the user to generate a user lifetime value; and
      comparing the user lifetime value to the threshold value; and
   providing, to a computing device associated with the third-party provider, a verification result indicating that the user satisfies the lifetime value verification or indicating that the user does not satisfy the lifetime value verification.

2. The method of claim 1, further comprising providing an application to the client device associated with the user, wherein the application:
   prompts the user to authorize the verification request to provide the lifetime value verification to the third-party provider; and
   receives user input that verifies an identity of the user.

3. The method of claim 1, wherein: determining whether the user satisfies the lifetime value verification comprises determining that the user lifetime value meets or exceeds the threshold value; and
   the verification result indicates that the user satisfied the lifetime value verification.

4. The method of claim 1, wherein determining whether the user satisfies the lifetime value verification further comprises:
   identifying a threshold value within the verification request by parsing information within the verification request; and
   identifying the user lifetime value by accessing digitally verifiable information within the blockchain associated with the user.

5. The method of claim 4, wherein determining whether the user satisfies the lifetime value verification further comprises identifying, within the verification request, at least one parameter limiting the digitally verifiable transaction information to be considered in determining the user lifetime value, wherein the at least one parameter comprises at least one of a transaction type, a product category, or a range of time.

6. The method of claim 1, further comprising:
   receiving, from a third-party system, digitally verifiable transaction information corresponding to activity of the user on the third-party system;
   generating a transaction record that includes the digitally verifiable transaction information corresponding to activity of the user on the third-party system based on a user authorization to collect and store the digitally verifiable transaction information; and
   adding the transaction record to the blockchain associated with the user.

7. The method of claim 1, further comprising generating a binary result that indicates whether the user satisfies the lifetime value verification, wherein providing the verification result to the third-party provider comprises providing the binary result with no additional user information.

8. The method of claim 1, wherein providing the verification result to the third-party provider causes the third-party provider to activate an offer for the user based on the verification result indicating that the user satisfies the lifetime value verification.

9. A non-transitory computer-readable medium storing instructions that, when executed by at least one processor, cause a computing device to:
   receive, from a first third-party provider, transaction data in response to a user interacting with the first third-party provider;
   generate, based on a user authorization to track transaction information received from a client device associated with the user, a transaction record using the transaction data received from the first third-party provider;

add, within a secure database, the transaction record to a blockchain associated with the user by appending the transaction record to one or more previously added transaction records;

in response to receiving an encoded verification request from the client device and corresponding to a second third-party provider, generate a verification result for the user based on:
  decoding the encoded verification request that was encoded with a private security token at the client device and directly authorized by the user at the client device;
  identifying, within the verification request, a threshold value to verify;
  analyzing transaction records within a blockchain associated with the user to generate a user lifetime value; and
  comparing the user lifetime value to the threshold value; and provide the verification result to the second third-party provider.

10. The non-transitory computer-readable medium of claim 9, further comprising instructions that, when executed by at least one processor, cause a computing device to encode the transaction record before adding the transaction record to the blockchain associated with the user.

11. The non-transitory computer-readable medium of claim 9, further comprising instructions that, when executed by at least one processor, cause a computing device to receive, from a client device associated with the user, a user preference defining a scope of the authorization to track transaction information.

12. The non-transitory computer-readable medium of claim 11, wherein the user preference provides authorization to track transaction information from a defined list of third-party providers.

13. The non-transitory computer-readable medium of claim 11, wherein the user preference specifies that the user directly authorizes transaction information on a transaction-by-transaction basis.

14. The non-transitory computer-readable medium of claim 11, wherein the user preference provides authorization to track transactional information corresponding a product category.

15. The non-transitory computer-readable medium of claim 9, further comprising instructions that, when executed by at least one processor, cause a computing device to create an additional blockchain associated with the user, wherein the blockchain comprises transaction records corresponding to the first third-party provider and the additional blockchain comprises transaction records corresponding to the second third-party provider.

16. The non-transitory computer-readable medium of claim 15, further comprising instructions that, when executed by at least one processor, cause a computing device to:
  receive, from the client device associated with the user, an indication to combine the blockchain and the additional blockchain; and
  in response to receiving the indication to combine, combine the blockchain and the additional blockchain into a single blockchain that comprises the transaction records corresponding to the first third-party provider and the transaction records corresponding to the second third-party provider.

17. The non-transitory computer-readable medium of claim 9, further comprising instructions that, when executed by at least one processor, cause a computing device to analyze the transaction data to locate a user identifier that indicates the transaction data received from the first third-party provider is associated with the user.

18. A system to allow a user to control sharing of personal information to verify digital transaction history of the user, the system comprising:
  a secure database comprising:
    a plurality of user accounts corresponding to a plurality of users; and
    digitally verifiable information associated with each user account of the plurality of user accounts; and
  a server device comprising instructions thereon that, when executed by at least one processor, cause the server device to:
    receive, from a client device associated with a user of the plurality of users, an encoded verification request associated with a third-party provider to verify a lifetime value of the user for the third-party provider, wherein the verification request is encoded with a private security token at the client device and wherein the user authorizes the verification request at the client device;
    decoding the encoded verification request;
    identifying, within the verification request, a threshold value to verify;
    identify the lifetime value of the user based on analyzing the digitally verifiable information associated with a user account corresponding to the user within a blockchain associated with the user;
    compare the lifetime value for the user to the threshold to determine that the lifetime value of the user satisfies the threshold value included within the verification request associated with a third-party provider; and
    provide, to a computing device associated with the third-party provider, a verification result indicating that the user satisfies the verification request associated with a third-party provider by providing a binary indication of the verification result.

19. The system of claim 18, wherein comparing the lifetime value for the user the user comprises determining the lifetime value for the user meets or exceeds the threshold value.

20. The system of claim 18, wherein the digitally verifiable information within the blockchain comprises transaction records based on previous digital transactions of the user.

* * * * *